(12) United States Patent
Narum et al.

(10) Patent No.: US 6,866,928 B2
(45) Date of Patent: Mar. 15, 2005

(54) CLEANLY REMOVABLE TAPES AND METHODS FOR THE MANUFACTURE THEREOF

(75) Inventors: Timothy N. Narum, Lake Elmo, MN (US); James J. Kobe, Newport, MN (US); Rodger J. Pereyra, Cottage Grove, MN (US); Zhiming Zhou, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/118,120

(22) Filed: Apr. 8, 2002

(65) Prior Publication Data

US 2003/0190464 A1 Oct. 9, 2003

(51) Int. Cl.[7] .................................................. C09J 7/02
(52) U.S. Cl. ...................... 428/354; 428/345; 428/343; 428/346; 428/355 AC; 428/40.1; 428/920; 428/921; 248/205.3; 427/208; 427/208.2; 427/208.4
(58) Field of Search ................................ 428/343, 345, 428/346, 354, 355 AC, 920, 921, 40.1; 248/205.3; 427/208, 208.2, 208.4

(56) References Cited

U.S. PATENT DOCUMENTS

| RE24,906 E | 12/1960 | Ulrich |
| 4,024,312 A | 5/1977 | Korpman |
| 4,310,509 A | 1/1982 | Berglund et al. |
| 4,323,557 A | 4/1982 | Rosso et al. |

(List continued on next page.)

FOREIGN PATENT DOCUMENTS

| DE | 33 31 016 | 10/1984 |
| DE | 42 22 849 | 6/1993 |
| DE | 43 39 604 | 5/1995 |
| DE | 44 28 587 | 6/1996 |
| DE | 195 31 696 | 3/1997 |
| DE | 196 49 728 | 6/1998 |

(List continued on next page.)

OTHER PUBLICATIONS

James M. Kobe et al, U.S. Appl. No. 09/775,955, filed Feb. 2, 2001.

Zhiming Zhou et al., U.S. Appl. No. 09/764,478, filed Jan. 17, 2001.

Primary Examiner—Daniel Zirker
(74) Attorney, Agent, or Firm—Daniel R. Pastirik

(57) ABSTRACT

The present invention provides a multi-layer tape, comprising: a first adhesive layer comprising a pressure sensitive adhesive; a core layer having an outer surface, the first adhesive layer adhered to at least a portion of the outer surface; and fibrous reinforcing material dispersed within the core layer, the fibrous reinforcing material imparting stretch release properties to the tape. The tape may comprise a second adhesive layer wherein the outer surface comprises a first major surface and a second major surface, the first adhesive layer being adhered to the first major surface, and the second adhesive layer being adhered to the second major surface. A fire retardant may be disposed in any of the first adhesive layer, the second adhesive layer, and the core layer. The tape may be cleanly removable. The fibrous reinforcing material typically comprises substantially continuous viscoelastic microfibers having a yield strength and a tensile break strength, and the tensile break strength is at least about 150% of the yield strength. In another aspect, the tapes of the invention may be formulated to be cleanly removable without including fibrous reinforcing material therein. The invention also provides a method for the manufacture of the foregoing tape as well as an assembly comprising: a substrate; a carpet overlying the substrate; and a tape according to the invention disposed between the carpet and the substrate and adhering the carpet to the substrate.

15 Claims, 2 Drawing Sheets

U.S. PATENT DOCUMENTS

| | | |
|---|---|---|
| 4,472,480 A | 9/1984 | Olson |
| 4,822,658 A | 4/1989 | Pacione |
| 5,191,692 A | 3/1993 | Pacione |
| 5,230,701 A | 7/1993 | Meyer et al. |
| 5,409,189 A | 4/1995 | Lühmann |
| 5,491,012 A | 2/1996 | Lühmann et al. |
| 5,516,581 A | 5/1996 | Kreckel et al. |
| 5,660,922 A | 8/1997 | Herridge et al. |
| 5,804,610 A | 9/1998 | Hamer et al. |
| 5,851,663 A | 12/1998 | Parsons et al. |
| 5,932,298 A | 8/1999 | Moon |
| 5,989,708 A | 11/1999 | Kreckel |
| 6,022,914 A | 2/2000 | Nowak et al. |
| 6,045,895 A | 4/2000 | Hyde et al. |
| 6,107,219 A | 8/2000 | Joseph et al. |
| 6,197,397 B1 | 3/2001 | Sher et al. |
| 6,231,962 B1 | 5/2001 | Bries et al. |
| 6,284,378 B1 | 9/2001 | Junghans et al. |
| 2002/0164446 A1 * | 11/2002 | Zhou et al. ................ 428/40.1 |

FOREIGN PATENT DOCUMENTS

| | | |
|---|---|---|
| DE | 197 23 117 | 12/1998 |
| EP | 0 775 736 | 5/1997 |
| EP | 1 097 976 | 5/2001 |
| WO | WO 92/11332 | 7/1992 |
| WO | WO 92/11333 | 7/1992 |
| WO | WO 99/31193 | 6/1999 |
| WO | WO 01/14489 | 3/2001 |
| WO | WO 01/57152 | 8/2001 |

* cited by examiner

CLEANLY REMOVABLE TAPES AND METHODS FOR THE MANUFACTURE THEREOF

This invention relates to a cleanly removable tape, in particular, a stretch-releasable tape, for joining two substrates or for securing a floor covering, such as carpet, to a substrate and to methods of making the tape.

BACKGROUND OF THE INVENTION

Adhesive materials, including pressure sensitive adhesives (PSAs), are commercially available for use in any of a variety of applications and industries such as in the construction of mounting tapes, carpet tapes and the like. Some carpet tapes comprise a backing, such as, for example, a cloth or film backing, with an adhesive coating on each of the major surfaces of the backing. Adhesives used in carpet tape applications have typically been pressure sensitive adhesives having (1) aggressive and permanent tack, (2) adherence to both a substrate and an adherend (e.g., a carpet backing) with no more than finger pressure, and preferably (3) being removable from the adherend. Pressure-sensitive adhesive tapes, such as carpet tapes, provide a strong bond to substrates because separation of the tapes from the substrates is neither intended, nor desired. When removal of the carpet is desired, pressure sensitive carpet tapes made with aggressively tacky PSAs have been very difficult to remove from a substrate and may result in damage to the substrate or may leave a tacky adhesive residue. Substrate damage is especially problematic for aerospace carpet tape applications where the substrate, e.g., a floor panel, may be costly to replace. Moreover, during the life of a carpet, dirt is ground into the carpet fabric and, over time, penetrates through the carpet to damage the underlying tape by causing nicks, cuts or small tears in the tape backing. When the carpet is subsequently removed, the damage to the backing can cause the tape to break, making it more difficult to remove from the substrate.

Some pressure sensitive adhesives have been specifically formulated to allow clean and easy removal from substrates after use, such as, for example, the adhesive used for Post-It® brand removable notes, available from Minnesota Mining and Manufacturing Company of St. Paul, Minn. These adhesives, however, do not possess sufficient tack to provide a level of holding power sufficient for use in carpeting applications, for example. In general, adhesives that are formulated to provide a substantial level of adhesion, e.g., for holding a carpet to a substrate, are difficult to remove from a substrate without significant effort.

U.S. Pat. No. 4,024,312 discloses a film backed, normally tacky and pressure-sensitive adhesive tape which is highly extensible and highly elastic. The tape can be removed from a surface to which it has been applied by stretching it lengthwise in a direction substantially parallel to the plane of the surface. The film backing is formed from a composition comprising elastomeric and thermoplastic A-B-A block copolymers and possesses a lengthwise elongation to break of at least about 200%, and a 50% rubber modulus of not above about 2,000 lbs/sq. inch. This low rubber modulus is stated to be an important factor in insuring easy stretchability and easy removal of the tape at high elongations. The elasticity of the backing is important for conformability and other purposes, and the elastic recovery from 50% stretch is stated as at least about 75%, more preferably at least about 90%.

German (OS) 3331 016 A1 discloses another adhesive tape for removable adhesive bonds, whereby the tape exhibits high elasticity and low plasticity. The adhesive strength is less than the cohesive strength, and the adhesion capability essentially disappears as the film is being stretched. The ratio of peel force to tear strength of the tape is about 1:2 or greater, and the adhesive bond can be released by pulling the film in the direction of the plane of the adhesive joint. The tape is used as a load-resistant adhesive to bond two rigid solid substrates. A separation of the adhesively bonded materials is possible without damage to the substrate.

The pressure sensitive adhesives described in U.S. patent application Ser. No. 09/764,478 now abandoned comprise a fibrous reinforcing material. The patent application describes the fibrous reinforcement of pressure sensitive adhesives to provide "stretch removable" characteristics. The fiber reinforced adhesive composition comprises a pressure sensitive adhesive matrix with a fibrous reinforcing material therewithin. The fiber reinforced adhesive composition is described as providing improved cohesive strength over the pressure sensitive adhesive alone, while the tack of the pressure sensitive adhesive remains substantially unreduced by the presence of the fibers.

In applications for tapes and other articles, a fire retardant feature may be needed and, in certain applications, may be required by applicable regulations. For example, tapes for electric or electronic applications may be directly exposed to electrical current, to short circuits, and/or to heat generated from the use of the associated electronic component or electrical device. Consequently, industry standards or regulations may impose conditions on the use of such tape articles that require qualifying tests be performed on the tapes such as burn tests, and the like. For electrical and electronics applications, the industry standard flammability test is Underwriters Laboratories (UL 94 "Standard for Tests for Flammability of Plastic Materials for Parts in Devices and Appliances"). For rail transit applications, the industry standard is American Society for Testing and Materials ASTM E662 ("Test Method for Specific Optical Density of Smoke Generated by Solid Materials") and ASTM E162 ("Test for Surface Flammability of Materials Using a Radiant Energy Source").

For aerospace applications, the testing criteria for the Federal Aviation Administration F.A.R. § 25.853 (July 1990) vertical burn test, subparagraph (a)(1)(i), relates to interior compartments occupied by crews or passengers, including interior ceiling panels, interior wall panels, partitions, galley structures, large cabinet walls, structural flooring, and materials used in the construction of stowage compartments. F.A.R. § 25.853 (July 1990) subparagraph (a)(1)(ii) relates to carpet tapes, seat cushions, padding, decorative and non-decorative coated fabrics, leather, trays and galley furnishings, electrical conduit, thermal and acoustical insulation and insulation covering air ducting, joint and edge covering and the like. Materials used for these applications must be self-extinguishing when tested vertically in accordance with the procedures of F.A.R. § 25.853 (July 1990) (a)(1)(i) and (a)(1)(ii). In addition for both rail transit and aerospace applications, another industry standard is Boeing Specification Support Standard, BSS 7239 ("Test Method for Toxic Gas Generation by Materials of Combustion") which requires analysis of combustion gases and has specified concentration limits on toxic gases which currently include HCN, $NO_x$, CO, HCl, HF, and $SO_2$.

In particular, carpet tapes for aerospace applications are presently defined by the Boeing Material Specification BMS 5-133C and are classified according to the following:

Type II, Class 1—Maximum weight 16 oz/yd2, white color;

Type II, Class 2—Maximum weight 16 oz/yd2, black color;

Type III—Maximum weight 24 oz/yd2, white color;

Type IV, Class 1—Differential tack, maximum weight 5.0 oz/yd2, black color on side 2; and Type IV, Class 2—Differential tack, maximum weight 9.0 oz/yd2, black color on side 2.

This specification lists key tests and requirements for each of the different Types. The specification includes weight, flammability according to F.A.R. § 25.853 (July 1990) (a)(1)(i) (12 Second Vertical Burn), tensile strength, peel strength, lap shear strength, corrosion to aluminum, and release liners.

In order to meet the requirements imposed on them in such applications, tapes and other articles may be made with materials that are naturally resistant to fire as well as materials that have been processed or manufactured to impart a fire retarding or fire resistant quality by incorporating fire retardant agents and the like. Current carpet tapes for aerospace applications utilize the fire retardants antimony trioxide and polybrominated biphenyls, specifically, decabromodiphenylether (deca-BDE). However, European authorities have recommended a ban of some of the polybrominated biphenyls as soon as Jul. 1, 2003. Such a ban will necessitate redesigned, reformulated tapes. Also in Europe, the Waste from Electrical and Electronic Equipment directive has proposed that halogenated flame retardants and certain other materials be phased out by January 2004.

Two key features are driving the need for an improved fire retardant carpet tape invention for aerospace industry.

1. Environment regulations requiring acceptable fire retardant systems; and
2. Clean removable tapes which effectively and efficiently improve the removal process and eliminate damage to floor substrates and which do not leave adhesive residue.

Cleanly removable tapes would provide a cost saving to the aerospace industry and would reduce or eliminate the need to use solvents to remove adhesive residues. Fire retardant carpet tapes will eventually be required to meet the new environmental legislation being adopted in Europe and around the world.

It would be desirable to provide pressure sensitive adhesive tapes and methods for the manufacture of such tapes. More specifically, it would be desirable to provide pressure sensitive adhesive tapes in the form of multi-layer tapes, such as, double-sided tapes, and the like that can be easily cleanly removed from a substrate without leaving significant adhesive residue. It would be especially desirable to provide these pressure sensitive adhesive tapes in a form that permits their removal from a substrate using a stretch-release mechanism, and wherein the tapes are fire retardant and satisfy government and/or industry flammability regulations.

SUMMARY OF THE INVENTION

In one aspect, the invention provides a multi-layer tape, comprising: a first adhesive layer comprising a pressure sensitive adhesive; a core layer having an outer surface, the first adhesive layer adhered to at least a portion of the outer surface; and fibrous reinforcing material dispersed within the core layer, the fibrous reinforcing material imparting stretch release properties to the tape.

The tape may comprise a second adhesive layer wherein the outer surface comprises a first major surface and a second major surface, the first adhesive layer being adhered to the first major surface, and the second adhesive layer being adhered to the second major surface. The first and second adhesives may be selected from any of a variety of materials such as acrylic polymers, polyurethanes, thermoplastic elastomers, block copolymers, polyolefins, silicones, rubber based adhesives, a blend of an acrylic adhesive and rubber based adhesive, and combinations of the foregoing. A fire retardant may be disposed in any of the first adhesive layer, the second adhesive layer, and the core layer, and the fire retardant may be selected from antimony free fire retardant, polybrominated biphenyl free fire retardant, intumescent fire retardant, and combinations thereof. Optionally, the tape may also include a synergist.

With a fire retardant included in the tape, the tape is formulated to pass (1) F.A.R. § 25.853 (July 1990), 12 Second Vertical Burn Test; (2) F.A.R. § 25.853 (July 1990), 60 Second Vertical Burn Test; (3) UL-94 V-2 rating; (4) ASTM E162 with maximum flame spread index of 35; (5) ASTM E662 with maximum specific optical density for flaming and nonflaming modes of 100 maximum (1.5 minutes) and 200 maximum (4.0 minutes); (6) BMS 5-133 C issued Sep. 29, 1993 except for tensile strength; or (7) BSS 7239. The tape may be cleanly removable. The fibrous reinforcing material typically comprises substantially continuous viscoelastic microfibers having a yield strength and a tensile break strength, and the tensile break strength is at least about 150% of the yield strength. The viscoelastic microfibers may be selected from homopolymers, copolymers, terpolymers, or tetrapolymers of polyalkylene resins and combinations of the foregoing. Other possible features are described herein.

In describing the features of the present invention, certain terms used are intended to be interpreted in a manner consistent with their usage by those skilled in the art. By way of example, and not limitation, the following meanings are set forth:

"Substantially continuous," when referring to fibers, means that for an at least 0.5 centimeter length sample of the adhesive composition taken in the machine direction, a substantial number of the fibers present in the sample are unbroken.

"Intumescent fire retardant" refers to an intumescent substance that when applied to or incorporated within a combustible material, reduces or eliminates the tendency of the material to ignite when exposed to heat or flame, induces charring and liberates non-combustible gases to form a carbonific material that protects the surrounding matrix, cuts off the oxygen supply, and prevents dripping. Intumescent fire retardants generally comprise an acid source, a char former, and a blowing agent.

"Fire retardant" refers to a substance that when applied to or incorporated within a combustible material, reduces or eliminates the tendency of the material to ignite when exposed to heat or flame.

"Cleanly removable" refers to the property of an adhesive article characterized in that, when the article is pulled from a surface at a rate of no greater than 30 centimeters/minute, the article detaches from the surface of the substrate without leaving significant visible residue, excluding discoloration, on the surface.

"Stretch release" refers to the property of an adhesive article characterized in that, when the article is pulled from a surface or from between two surfaces at a rate of no greater than about 30 centimeters/minute and at an angle of no greater than about 45°, the article detaches from at least one of the surfaces of the substrates.

In another aspect, the invention provides a fire retardant, multi-layer carpet tape, comprising: a first adhesive layer comprising a first pressure sensitive adhesive; a second adhesive layer comprising a second pressure sensitive adhesive; a core layer disposed between said first adhesive layer and said second adhesive layer; a fire retardant disposed in at least one of the first adhesive layer or the second adhesive layer, the fire retardant being essentially free of antimony and polybrominated biphenyls; and the tape being cleanly removable.

In this aspect of the invention, the fire retardant may be selected from intumescent fire retardants, brominated phosphate fire retardants, and combinations of the foregoing. The various features of the first and second pressure sensitive adhesives, and the core layer are as previously described.

In still another aspect of the invention, a method is provided for the manufacture of a tape, comprising: providing a core layer having an outer surface; applying a first adhesive layer to at least a portion of the outer surface, the first adhesive layer comprising a pressure sensitive adhesive; and one or both of the core layer and the first adhesive layer comprising a fibrous reinforcing material imparting stretch release properties to the tape. The outer surface of the core layer may typically comprises a first major surface and a second major surface, the first adhesive layer being applied to the first major surface. The method may further comprise applying a second adhesive layer to the second major surface. The remaining various features of the tape made according to the foregoing method are as previously described.

In yet another aspect of the invention, a method for the manufacture of a tape is provided, comprising: providing a core layer having an outer surface; applying a first adhesive layer to at least a portion of the outer surface, the first adhesive layer comprising a first pressure sensitive adhesive; and at least one of the first adhesive layer or the core layer further comprise a fire retardant selected from the group consisting of antimony free fire retardant, polybrominated biphenyl free fire retardant, intumescent fire retardant, and combinations of the foregoing, the core layer and the first adhesive layer providing cleanly removable properties to the tape. The outer surface may comprise a first major surface and a second major surface, and applying of a first adhesive layer comprises applying the pressure sensitive adhesive to the first major surface, the method further comprising applying a second adhesive layer to the second major surface. In this aspect of the invention, the various features of the tape made according to the foregoing method are as previously described.

In the foregoing methods of manufacture, the core layer and at least one of the first adhesive layer or the second adhesive layer are typically manufactured using an extrusion method, and the layers may be co-extruded. Prior to use, the thus manufactured tape is generally exposed to a radiation source to cross-link at least one of the core, the first adhesive layer, or the second adhesive layer.

In still another aspect of the invention, an assembly is provided comprising: a substrate; a carpet overlying the substrate; and a tape according to the invention disposed between the carpet and the substrate and adhering the carpet to the substrate.

The invention also includes multi-layer articles, such as for example, multilayer tapes or sheets, adhesive transfer tapes, single-sided tapes, double-sided tapes, double-sided tapes with differentiated adhesion, and substrates onto which the adhesive has been directly applied. The tapes described herein may include a tab.

Other features and advantages of the invention will be apparent from the following description of the preferred embodiments thereof, and from the claims.

BRIEF DESCRIPTION OF THE DRAWINGS

In describing the various features of the preferred embodiment, reference is made to the various Figures, in which like reference numerals indicate like features and wherein.

DETAILED DESCRIPTION OF THE PREFERRED EMBODIMENT

The invention provides a cleanly removable tape that can be used as a joining and mounting tape such as, for example, a carpet tape. The tapes are provided in layered constructions with stretch release properties to enable removal from a substrate without leaving significant residue on the surface of the substrate. The tapes comprise a core layer and at least a first adhesive layer adhered to at least a portion of the core layer. The tapes may be single sided tapes or double sided tapes. Single sided tapes are tapes having adhesive properties on one side only. Double sided tapes are tapes having adhesive properties on both sides.

The first adhesive layer is provided as a skin adhesive on at least a portion of a first major surface of the core layer while the other major surface of the core layer may be provided with its own adhesive properties. Alternatively, a second adhesive layer may be provided to a portion of the core layer as another skin adhesive which may be the same adhesive as the first adhesive layer, or it may be a different than the first adhesive layer. The tapes of the invention may be dual sided tapes in that they are adhesively tacky on both sides of the core layer to permit the simultaneous adhesion of the tape to two different surfaces such as an article (e.g., a carpet backing) and a substrate (e.g., a floor).

A fibrous reinforcing material may be dispersed in the core layer, the adhesive layer(s), or both the core layer and the adhesive layer(s) to provide stretch release properties to the construction. The tape of the invention may include a core layer and a fire retardant in at least one of the adhesive layer, or the core layer. The fire retardants most desired in the present invention are those containing no antimony or polybrominated biphenyls, such as, pentabromodiphenylether (penta-BDE), octabromodiphenylether (octa-BDE), and decabromodiphenylether (deca-BDE).

Figure 1:
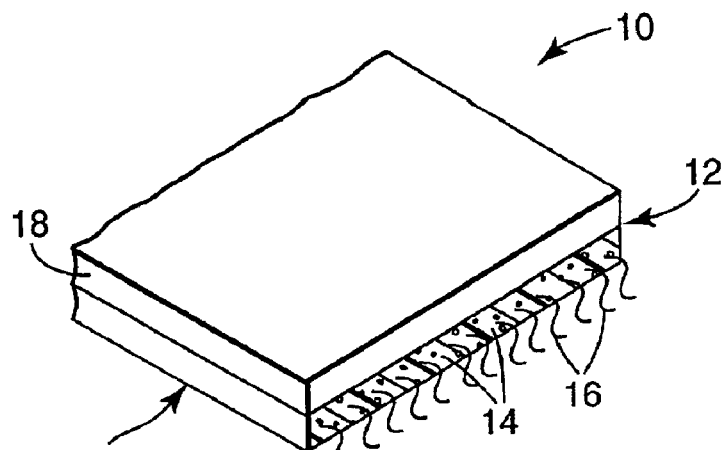
FIG. 1 is a perspective drawing showing a tape, according to the invention.

Referring to the drawings, a first embodiment of a tape 10 according to the invention is shown in FIG. 1. The tape includes a core layer 14 in the form of a sheet having a first major surface 12 and a second major surface 13 opposite the first major surface 12. The major surfaces of the core layer 14 are typically smooth, but one or both of the major surfaces of the tape 10 may be provided with a texture or surface structures thereon. In the described embodiment, the core layer 14 comprises a plurality of viscoelastic and/or elastic microfibers 16 oriented in the manufacturing machine direction of the tape. The microfibers 16 provide the core layer 14 and the tape 10 with stretch releasable qualities when the tape 10 is adhered to a surface. A first adhesive layer 18 is adhered to at least a portion of the first major surface 12 of the core layer 14. Typically, the first adhesive layer 18 comprises a pressure sensitive adhesive (normally as a skin adhesive), but other types of adhesives may also be used. Additional microfibers (not shown) may be included in the formulation of the first adhesive layer 18 as desired to further enhance the stretch release qualities of the tape by reinforcing the tape, especially when the tape is thin, i.e., less than about 0.25 mm (10 mils) or when the adhesive layer has high adhesion to a surface to which it is applied.

The core layer 14 may be provided with adhesive properties so that the second major surface 13 of the core layer 14 has adhesive tack suited for the intended use of the tape product. The tackiness of the second major surface 13 is typically different than the tackiness of the first adhesive layer 18. In carpet tape applications, the tackiness of the first adhesive layer 18 is generally formulated to provide a strong adhesive bond to a floor or other substrate while the tackiness of the core layer 14 along its second major surface 13 is formulated to provide a sufficiently strong bond to the material used for the backing of the carpet, and the bond between the carpet and the second major surface 13 is normally somewhat weaker than the adhesive bond between the first adhesive layer 18 and the floor or other substrate.

The tape 10 may also include a tab (not shown) positioned thereon so that the tape 10 may be removed from a substrate by pulling the tab and the tape in the direction of the oriented microfibers 16, i.e., in the machine direction. In general, to remove a stretch releasable tape of the invention from between two substrates, the tape is moved by pulling on the tape or the tab in a direction substantially parallel to the two surfaces. For carpeting adhered to a floor, the carpet or other adhered material is first removed from the tape by pulling the carpet or other material from the second major surface 13 of the tape 10. The tape 10 will remain adhered to the floor along the first major surface 12 via first adhesive layer 18, and removal of the tape 10 from the floor is accomplished by then stretching the tape in the machine direction at an angle from about 20° to about 45°, relative to the surface of the floor. Alternatively, when the carpet or other material is pulled up from the surface of a floor, the layers of the tape 10 may separate from one another leaving portions of the tape 10 that can be removed from the material and the substrate by the stretch-release mechanism.

In the removal process, a force is applied to the tape in a direction substantially parallel to the surface of the floor or other substrate. The removal force may be applied by gripping the aforementioned removal tab or an end of the tape and pulling the tape in the aforementioned direction. When sufficient force is applied to overcome the initial yield strength, the backing or core layer will deform. When the tape comprises viscoelastic microfibers, the tape will initially deform and then yield as the microfibers elongate and orient, thereby undergoing strain hardening. In addition, orientation induced by stretching further detackifies the adhesive layer. Stretching will thin the tape significantly at the location where the adhesive pulls away from the substrate. Thinning of the tape dramatically reduces the force required to remove the tape from the substrate. Pulling the tape from the substrate at an angle of less than about 45° will aid in the removal of the tape from the laminate. In certain aerospace applications, the substrate can be a fiber reinforced composite laminate or panel, and pulling the tape from the substrate at the foregoing angle significantly reduces the possibility that the panel surface will delaminate as a result of the tape removal process. Following the removal of the tape, the surface will be substantially clean with little or no visible adhesive residue remaining thereon.

Figure 2:
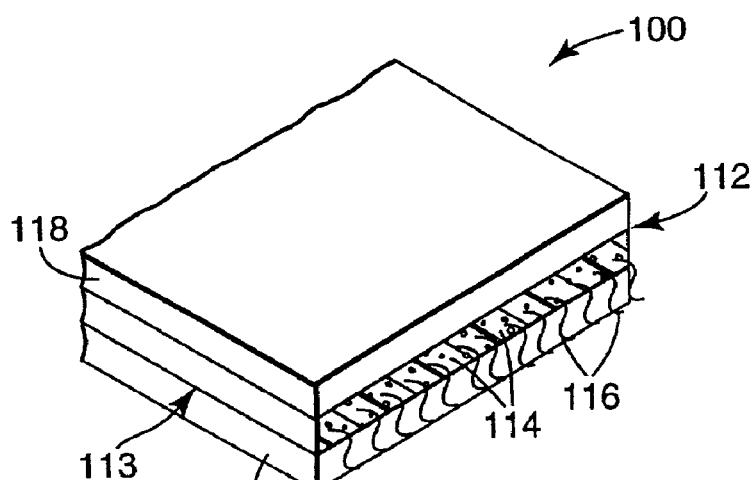
FIG. 2 is a perspective drawing showing a tape, according to another aspect of the invention.

Referring to FIG. 2, another embodiment of a tape 100 according to the invention is shown and will now be described. The tape 100 comprises core layer 114 having a first major surface 112 and a second major surface 113 and includes a plurality of microfibers 116 in the core layer 114. A first adhesive layer 118 is adhered to the first major surface 112 of the core layer 114 and a second adhesive layer 120 adhered to the second major surface 113 of the core layer 114. In this configuration, the core layer 114 need not be formulated as an adhesive. Both the first adhesive layer 118 and the second adhesive layer 120 are normally provided as pressure sensitive skin adhesives, and each of these adhesives may be provided as the same as the other, or the skin adhesives may be formulated differently from one another. The adhesive layers 118 and 120 are adhered to at least a portion of the major surfaces 112 and 113 of the core layer 114, and the adhesives may contain microfibers and comprise any of a variety of adhesive materials as are further described herein.

Figure 3:
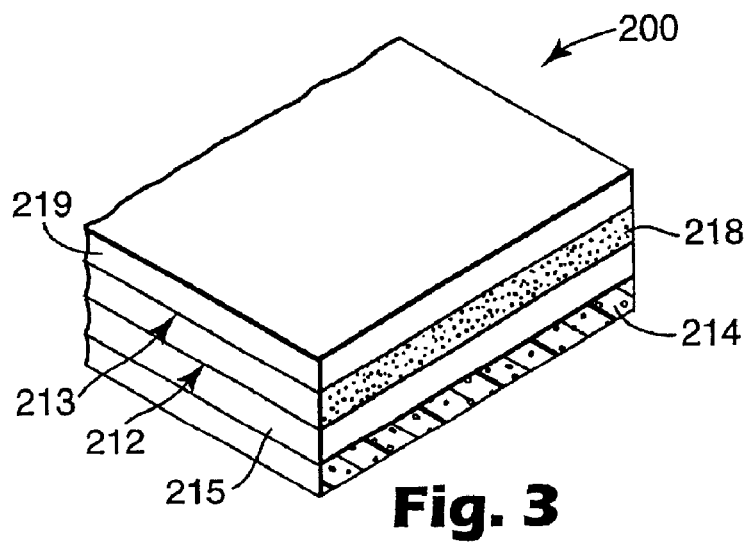
FIG. 3 is perspective drawing showing a tape according to yet another aspect of the invention.

Referring to FIG. 3, another embodiment of a fire retardant, cleanly removable carpet tape 200 according to the invention is shown. The tape 200 comprises a first adhesive layer 214, a core layer 215, a second adhesive layer 218, and a release liner 219. The core layer 215 is positioned between first adhesive layer 214 and first side 212 of second adhesive layer 218. The release liner 219 is adjacent to and overlays the second side 213 of second adhesive layer 218. In this configuration, both the first adhesive layer 214 and the second adhesive layer 218 are formulated as pressure sensitive adhesives. One or both of the first adhesive layer 214 and the second adhesive layer 218 may contain antimony-free and polybrominated biphenyls-free fire retardant. Typically, the fire retardant comprises an intumescent fire retardant, a brominated phosphate fire retardant, or a combination of such fire retardants. The second adhesive layer 218 and the first adhesive layer 214 may comprise any of a variety of materials as are further described herein. The materials in this embodiment may be selected so that the tape 200 prepared therefrom is cleanly removable but not necessarily stretch-releasable as defined above. Although not shown, another release liner similar to the release liner 219 may be associated with the first adhesive layer 214.

Suitable materials for the core layer 215 include any of a variety of films such as the polymeric films described herein. Alternatively, the core layer 215 may comprise woven and nonwoven materials, cloth, scrim, metallic foil, and the like. The core layer 215 may be or may not be elastic or viscoelastic. Normally, the core layer contains a fire retardant or is inherently fire retardant. The thickness of the core layer 215 is typically from about 0.0125 mm (0.0005 inch) to about 0.625 mm (0.025 inch), more often from about 0.0125 mm (0.0005 inch) to about 0.125 mm (0.005 inches) and most often from about 0.0125 mm (0.0005 inch) to about 0.051 mm (0.002 inches). The fire retardant, cleanly removable carpet tape described above can be prepared by any well known tape processing method such as by coating, such as, hot melt coating, solvent coating; lamination, hot melt extrusion and the like. In the tape 200, the materials used in the core layer 215 and the skin adhesives 214 and 218 are selected to be compatible with one another and to provide a cleanly removable tape according to the invention. If a microfiber forming resin is included in one of the layers of the tape 200, the microfiber-containing layer is processed in a manner that generates the microfibers in situ. If the microfibers are present in the tape 200, the tape may be made cleanly removable using a stretch release mechanism, as described herein. However, it will be appreciated that the tape 200 may be cleanly removable without including microfibers in any of the layers of the tape. Moreover, the tape 200 may be cleanly removable without necessarily being stretch releasable.

The skin adhesive layers used in the invention can be applied to the surface of the core layer in a continuous or discontinuous manner. One or more adhesives can be used in a single skin adhesive layer. For example, a first adhesive may be pattern coated on the surface of the core layer and a second adhesive is thereafter coated onto the portions of the surface with no first adhesive. Alternatively, a second adhesive could be pattern coated onto a continuous coating of the first adhesive. Typically, the adhesive is a pressure sensitive adhesive. Most often, the adhesive is a hot melt pressure sensitive adhesive. A release liner may optionally be applied over the adhesive to protect it prior to its application to a substrate or the like. It will be appreciated that other layers and/or structures may be applied or affixed to at least a portion of one of the major surfaces of the core layer.

Any of a variety of materials may be used in the formulation of a core layer for the tapes of the invention. For example, polymeric resins, including adhesives as well as blends thereof, may be used. Thermoplastic polymers and adhesives suitable for use as a core layer include those that are compatible with, but immiscible with the fibrous reinforcing material. It may be desirable to blend two or more polymers having chemically different compositions. The physical properties of the resulting core layer can be optimized by varying the types of components used in creating the tape and by varying their relative concentrations. A particular resin is generally chosen or selected based upon the desired properties of the final stretch releasable tape. The core layer typically contains one or more fire retardants, as described herein, and may be treated with adhesion promoters, binders, antistatic materials, and the like to impart additional properties thereto.

General criteria in the design of an acceptable general purpose stretch release, cleanly removable tape include: (1) break strength greater than the adhesion to the substrate such that the tape does not break during removal; (2) a Shore A hardness less than about 60, preferably, less than about 50, and more preferably less than about 45; (3) the skin adhesive preferably does not delaminate from the core layer; (4) the tape should stretch release in a cleanly removable manner from between a pair of substrates; (5) when the stretch release tape comprises viscoelastic microfibers, the tensile break strength should be at least about 150% of the yield strength of the tape with an elongation greater than about 200% and less than about 50% recovery after being elongated 100%, and when the stretch release tape comprises elastic fibers, the tape can have an elongation greater than about 200% and have greater than about 50% recovery after being elongated 100%; and (6) 90 degree peel adhesion to stainless steel or glass should generally be greater than about 0.176 kN/m (1 lbs/in), typically greater than about 0.352 kN/m (2 lbs/in), and often greater than 0.528 kN/m (3 lbs/in).

Where the stretch releasable tape is a carpet tape, the criteria includes: (1) a split strength greater than the adhesion to the substrate such that the tape does not break during removal; (2) a Shore A hardness less than about 60, preferably, less than about 50, and more preferably less than about 45; (3) the skin adhesive preferably does not delaminate from the core layer; (4) the tape should be cleanly removable and should stretch release from a floor; (5) when the stretch release tape comprises viscoelastic microfibers, the tensile break strength should be at least about 150% of the yield strength of the tape with an elongation greater than about 200% and less than about 50% recovery after being elongated 100%, and when the stretch release tape comprises elastic fibers, the tape can have an elongation greater than about 200% and have greater than about 50% recovery after being elongated 100%; (6) 90 degree peel adhesion to stainless steel or glass should generally be greater than about 0.352 kN/m (2 lbs/in), typically greater than about 0.704 kN/m (4 lbs/in), and often greater than 1.056 kN/m (6 lbs/in); (7) room temperature static sheer holding a minimum 250 g/in$^2$ for at least 10,000 minutes; and (8) optionally fire retardant.

Criteria for a fire retardant, cleanly removable carpet tape for aerospace applications includes: (1) satisfying the requirements of Boeing Material Specification BMS 5-133C, revised Sep. 29, 1993; and (2) free from antimony based fire retardant and/or polybrominated biphenyls fire retardants or other environmentally unacceptable fire retardants. In the instance when the fire retardant, cleanly removable carpet tape is additionally stretch releasable, the tape will meet all the requirements of BMS 5-133C except tensile strength.

One group of polymers useful in the manufacture of the core layer includes acrylate and methacrylate polymers and copolymers and combinations thereof. Such polymers can be formed by polymerizing one or more monomeric acrylic or methacrylic esters of non-tertiary alkyl alcohols, with the alkyl groups having from 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate.

Optionally, one or more monoethylenically unsaturated co-monomers may be polymerized with the acrylate or methacrylate monomers. The amount of co-monomer may be based upon the desired properties of the polymer. One group of useful co-monomers includes those having a homopolymer glass transition temperature greater than the glass transition temperature of the acrylate homopolymer. Examples of suitable co-monomers falling within this group include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobomyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids, vinylidene chloride, styrene, vinyl toluene, and alkyl vinyl ethers.

Another group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate (Tg=−71° C.) and methoxypolyethylene glycol 400 acrylate (Tg of −65° C.; available from Shin Nakamura Chemical Co., Ltd. under the designation "NK Ester AM-90G") and combinations thereof.

Another group of polymers useful for the core layer include polymers that are immiscible in, but are compatible with acrylic polymers. Examples include semicrystalline polymer resins such as polyolefins and polyolefin copolymers (e.g., based upon monomers having between 2 and 8 carbon atoms such as low density polyethylene, linear low density polyethylene, ultra low density polyethylene, metallocene polyethylene copolymer, terpolymer, and tetrapolymer; atactic polypropylene, amorphous polypropylene and isotactic polypropylene blend, ethylene-propylene copolymers, etc.), polyesters and co-polyesters, polyamides and co-polyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate and combinations thereof. Other examples of acrylate-immiscible polymers include amorphous polymers having a solubility parameter (as measured according to the Fedors' technique) less than 8 or greater than 11 such as polyacrylonitrile, polyvinyl chloride, thermoplastic polyurethanes, aromatic epoxies, polycarbonate, amorphous polyesters, amorphous polyamides, acrylonitrile-butadiene-styrene (ABS) copolymers, polyphenylene oxide alloys, ionomers (e.g., ethylene-methacrylic acid copolymers neutralized with salt), fluorinated elastomers, and polydimethyl siloxane and combinations thereof.

Another group of polymers useful for the core layer include thermoplastic elastomers containing ultraviolet radiation-activated groups. Examples include polybutadiene, polyisoprene, polychloroprene, random and block copolymers of styrene and dienes (e.g., SBR), and ethylene-propylene-diene monomer rubber and combinations thereof.

Another group of polymers useful for the core layer include pressure sensitive and hot melt adhesives prepared from non-photopolymerizable monomers. Such polymers can be adhesive polymers (i.e., polymers that are inherently adhesive), or polymers that are not inherently adhesive, but are capable of forming pressure sensitive adhesive compositions when compounded with tackifiers. Specific examples include poly-alpha-olefins (e.g., polyoctene, polyhexene, and atactic polypropylene), tackified block copolymer-based adhesives, natural and synthetic rubbers, silicones, ethylene-vinyl acetates, polyurethanes, and epoxy-containing structural blends (e.g., epoxy-acrylate and epoxy-polyester blends) and combinations of the foregoing.

As described above, the core layer includes a plurality of elastic, viscoelastic, or combination of elastic and viscoelastic microfibers that reinforce the core layer while also providing the tape with stretch release properties. Optionally, the elastic, viscoelastic, or combination of elastic and viscoelastic microfibers may also be included in both the core layer and skin adhesive layers. The microfibers are generated in situ from polymer resins during the manufacture of the core layer. Suitable microfibers include those formulated according to the teachings of pending U.S. patent application Ser. No. 09/764,478, now abandoned incorporated in its entirety herein by reference thereto.

In specific embodiments, the reinforcing microfibers are viscoelastic and comprise semi-crystalline polymers (e.g., having both amorphous and crystalline domains). Specific embodiments that incorporate semi-crystalline polymers include polycaprolactone (PCL), polybutene (PB), copolymers derived from ethylene and at least one other alpha-olefin monomer (e.g. poly(ethylene-co-1-alkene) and poly (ethylene-co-1-alkene-co-1-alkene)), ultra low density polyethylene such as is commercially available under the trade designation ATTANE 4202 from Dow Chemical Co. having a density below 0.915 grams/cubic centimeter, metallocene copolymers such as the commercially available ENGAGE series available from Dupont-Dow Elastomers, or the metallocene polyolefins such as those known under the trade designation EXACT 3024, 3040 and 3139 (available from ExxonMobil Chemical Company), linear low density polyethylene (e.g. having a density between 0.915 and 0.94 grams/cubic centimeter, such as those available from ExxonMobil Chemical Company under the designations LL-3003, ECD-125, 377D60, 369G09, 363C32, 361C33, 357C32, 350D65, 350D64, 350D60, LL-3013, and LL-3001, and the those known under the trade designation DOWLEX available from Dow Chemical Co.

In other embodiments, the reinforcing microfibers are elastic. Examples of suitable reinforcing elastic microfibers include thermoplastic elastomers such as for example those comprising polyurethane, synthetic block copolymers, and combinations of the foregoing materials.

The viscoelastic reinforcing microfiber materials will generally have a measurable yield strength. In certain embodiments, the yield strength of the reinforcing material is less than about 30 MPa. The tensile break strength of the viscoelastic reinforcing microfiber material is typically at least about 150% of its yield strength. In specific embodiments, the tensile break strength (measured according to ASTM D 882-97 at a crosshead speed of 12 inches/minute (30 centimeters/minute)) of the reinforcing microfiber material is higher than the tensile break strength of the skin adhesive and/or the core layer. Elastic reinforcing microfiber material should have greater than about 50% recovery after being elongated 100%. The reinforcing microfiber material should have a melting point above the use temperature of the skin adhesive composition and should have a melting point above the storage temperature of the adhesive composition or any tape made with the adhesive composition.

Most typically, the reinforcing microfiber material exists as substantially continuous fibers in the core and/or in adhesive layer. Specifically, according to one aspect of the invention, the microfibers are unbroken for at least about 0.5 centimeters in the machine direction of the adhesive or the core layer, preferably at least about 2 centimeters. In other desired embodiments, the substantially continuous microfibers are continuous for at least about 5 centimeters and desirably are at least about 8 centimeters. According to another aspect of the invention, the substantially continuous microfibers generally have a maximum diameter of about 0.05 to about 5 micrometers, typically from about 0.1 to about 1 micrometer. According to another aspect of the invention, the aspect ratio (i.e. the ratio of the length to the diameter) of the substantially continuous microfibers is greater than about 1000. In general, the polymeric material of the core layer will comprise from about 80 to about 50 weight % of the tape while the fibrous reinforcing material will comprise from about 20 to about 50 weight % of the tape. When the amount of fibrous reinforcing material comprises typically from about 40 to about 50 weight % of the final tape article, the tape may have a lower split strength or a weaker bond between the core layer and the skin layer(s). This provides another method of removal by splitting the tape, and stretch releasing each portion individually. This removal method can be advantageous when tapes are used between two large surfaces.

It has been found that a suitable stretch release chemistry useful in the present invention comprises viscoelastic microfibers of certain homopolymers, copolymers, terpolymers, and tetrapolymers of polyalkylene resins including copolymers of polyoctene-ethylene and/or polyhexene-ethylene and the like. The microfibers will form in situ during the manufacturing process to provide a tape and/or adhesive material that will stretch, strain-harden and release during removal from a substrate without breakage. In general, and without limitation, $C_3$–$C_{10}$ copolymers with ethylene are suitable for use in the invention. The foregoing polyoctene-ethylene and/or polyhexene-ethylene copolymers are compatible, but immiscible with many acrylic and rubber/resin based block copolymer adhesives and can be blended in a twin screw extruder, as described herein, to generate the microfibers in situ.

In certain applications such as in aerospace applications and the like, the tapes of the invention may be provided with fire retardant properties. Fire retardants suitable for inclusion in the tapes of the present invention include intumescent fire retardants and/or non-intumescent, antimony free fire retardants which can be present in any layer of the tape, but are generally present in the core layer and the skin adhesive layer(s) of the tape at a concentration of between about 20 wt. % and about 60 wt. % based on the total weight of the tape. If the fire retardant is present in the skin adhesive layer, it is normally present in an amount less than about 50 wt. % of the weight of the skin adhesive layer, more typically less than about 40 wt. % and most often less than 30 wt. %. Examples of suitable fire retardants for use in the tapes described herein include those commercially available from Clariant Corporation of Charlotte, N.C., under the designation EXOLIT, including those designated IFR 23, AP 422, AP 423, AP 452(TP), AP 462, AP 740(TP), AP 750, AP 751(TP), and AP 752(TP), all of which are non-halogenated fire retardants comprising ammonium polyphosphate and/or synergists. Synergists are other fire retardant materials that, when combined with another fire retardant, provide enhanced fire retardant properties greater than the additive properties of the two fire retardant materials. EXOLIT OP grade materials, such as, OP 550, OP 910, OP 920(TP), OP 921(TP), OP 1100(TP), EXOLIT 5060, EXOLIT 5073, EXOLIT 5085(VP), and EXOLIT 5087, also from Clariant Corporation, based on organophosphorous compounds are also useful as well as EXOLIT RP grades of red phosphorus materials, such as, RP 622, RP 650, RP 652, RP 654, RP 658, RP 659(TP), RP 683(TP), RP 689(TP), RP 692, RP 693, and RP 694. Other non-halogenated fire retardants that may be used include FIREBRAKE ZB and BORGARD ZB which are zinc borate and zinc borate hydrate respectively, ammonium borate/diborate/tetraborate tetrahydrate, ammonium pentaborate x $8H_2O$, FYREX which is a mixture of diammonium and monoammonium phosphate, available from Akzo Nobel, Gallipolis Ferry, W.Va.; triphenyl phosphate, di-melamine phosphate, potassium bicarbonate, potassium aluminum sulfate, MELAPUR 25 and MELAPUR p-46 which are both melamine cyanurates; MELAPUR 200 which is melamine polyphosphate, all three of which are available from DSM Melamine Americas, Inc. Westwego, La.; AMGARD NH which is melamine phosphate, ANTI-BLAZE NP which is alkyl amine phosphate, ANTIBLAZE NK which is alkyl amine phosphate salt, ANTIBLAZE MC which is ammonium polyphosphate, and AMGARD NP which is ethylene diamine phosphate, all of which are available from Albright & Wilson Americas Inc., Richmond, Va.; REOGARD 1000 which is a proprietary intumescent fire retardant which is available from Great Lakes Chemical Corp., West Lafayette, Ind.; aluminum trihydrate (ATH), magnesium oxide, and magnesium hydroxide. Useful halogenated phosphate fire retardants that may be used include TCEP (tris(2-chloroethyl)phosphate) and TCPP (tris(2-chloroisopropyl)phosphate) both of which are available from Clariant Corporation, and FR 370 (tris (tribromoneopentyl) phosphate) available from Dead Sea Bromine Group, Beer Shiva, Israel. Further examples of useful fire retardants that are non-intumescent are described in U.S. Pat. No. 6,022,914 (Nowak et al.) and intumescent fire retardants that are described in U.S. Pat. No. 5,851,663 (Parsons et al.) both of which are incorporated herein by reference.

Blends of one or more fire retardants may also be used in the tapes of the invention. Suitable blends include blends of EXOLIT AP 750 and FR370 and EXOLIT IFR 23 and FR 370 in a weight ratio ranging from about 5:95 to about 95:5, and blends of mono-ammonium phosphate, ammonium sulfate, and magnesium aluminum silicate available as FORAY from Ansul Incorporated. Blends of one or more fire retardants and a synergist may also be used in the tapes of the invention. Suitable synergists include talc, magnesium compounds, zinc compounds such as zinc borate, $Fe_2O_3$, $MoO_3$, special zeolite, boroxo siloxane elastomer, which are discussed in article "Influence of Modified Rheology on the Efficiency of Intumescent Flame Retardant Systems", P. Anna et al., *Polymer Degradation and Stability*, Vol. 74 (3), 2001, pp. 423 to 426. A synergist for both brominated and phosphorus fire retardants is CIBA FLAMESTAB NOR 116 fire retardant material available from Ciba, Tarrytown, N.Y. There appears to be a synergy between the ammonium polyphosphate based intumescent fire retardants with brominated phosphate, melamine phosphate, and/or melamine polyphosphate fire retardants. While halogenated fire retardant materials are generally not preferred, some halogenated materials may be effective in the present invention.

It has been discovered that FR 370, which is tris (tribromoneopentyl) phosphate, is a very effective fire retardant for the preparation of fire retardant, cleanly removable carpet tapes. FR 370 has not been identified by environmental groups, such as the European Parliament, as a troublesome substance and has been determined to be an effective replacement for antimony trioxide and/or polybrominated biphenyls.

The core layer may also include a number of other additives. Examples of suitable additives include tackifiers (e.g., rosin esters, terpenes, phenols, and aliphatic, aromatic, or mixtures of aliphatic and aromatic synthetic hydrocarbon resins), plasticizers, pigments, dyes, non-expandable polymeric or glass microspheres, expandable microspheres, reinforcing agents, hydrophobic or hydrophilic silica, calcium carbonate, toughening agents, antioxidants, finely ground polymeric particles such as polyester, nylon, or polypropylene, stabilizers, conductive particulates (thermally and/or electrically conductive), antistatic agents, fillers, blowing agents, adhesion promoters, such as silanes, nanoparticles, such as nanoclay, non-polymeric fibers, and combinations thereof. The foregoing additional agents and components are generally added in amounts sufficient to obtain a tape having the desired end properties, but not so as to interfere with microfiber formation described herein. Preferably, the total volume percent of all additives is less than about 70 volume percent, more preferably, less than about 60 volume percent, and most preferably, less than about 50 volume percent. In addition, it is preferred that the particle size of the additive(s) is small (i.e., no greater than about 100 micrometers, typically no greater than about 10 micrometers, often no greater than about 5 micrometers, and most often no greater than about 1 micrometer) in order not to interfere with microfiber formation.

Figure 4:
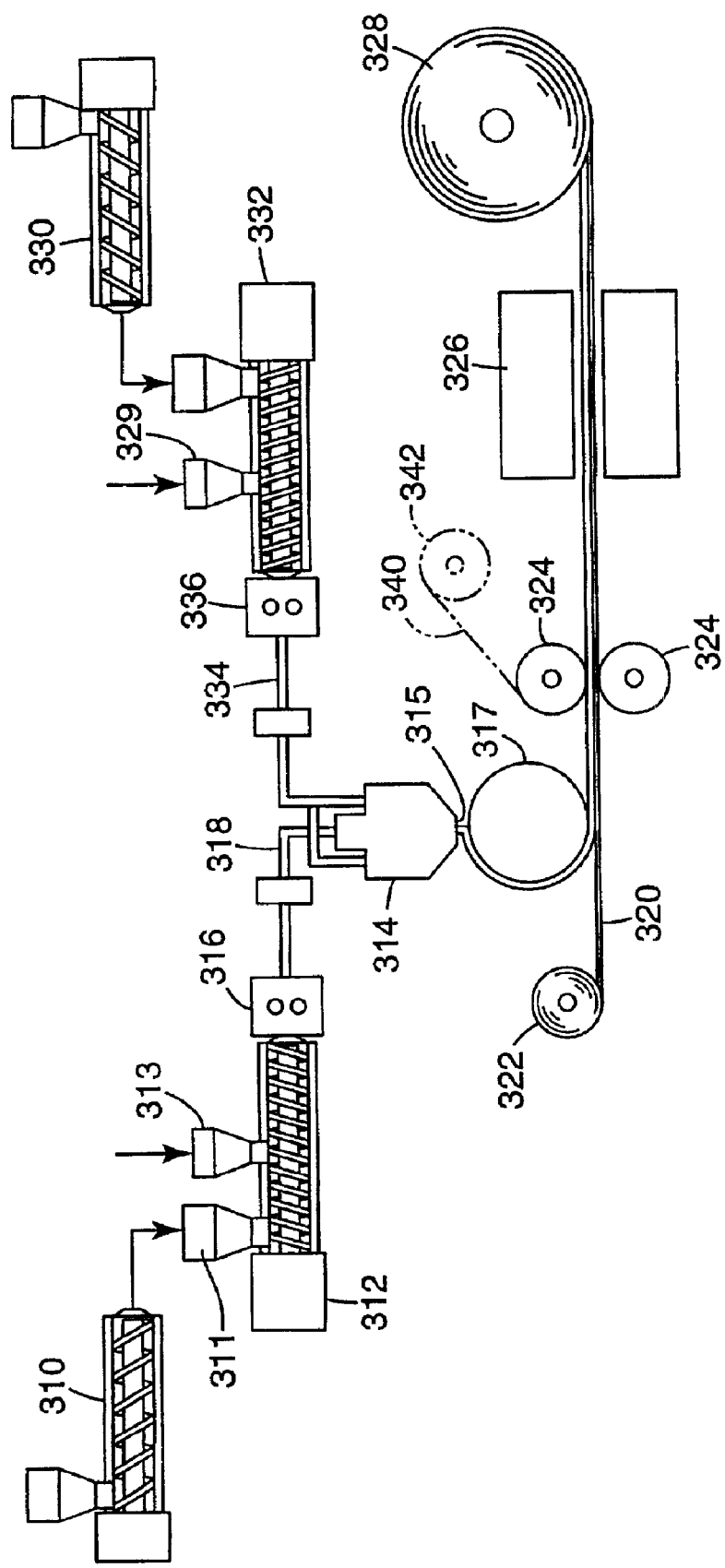
FIG. 4 is a schematic drawing of an extrusion process line suitable for the manufacture of the tapes of the invention.

Referring to FIG. 4, an extrusion process is shown for preparing stretch release tape according to the invention.

According to the process of the invention, polymer resin or adhesive polymer is fed into a first extruder 310 (typically a single screw extruder) to soften, grind, or melt the resin into a form suitable for extrusion. The resulting polymer resin will form the core layer. The polymer resin may be added to the extruder 310 in any convenient form, such as pellets, billets, packages, strands, pouches and ropes. Next, the polymer resin is fed to a second extruder 312 (e.g., typically a twin screw extruder). The polymer resin may be fed directly from the extruder 310 into second extruder 312 through port 311. Other additives, such as fire retardants and microfiber forming resin, can be fed into any port and are typically fed into the second extruder 312 at entrance 313 and are well mixed in a kneading zone. The order of component addition and mixing conditions (e.g., screw speed, screw length, and temperature) are selected to achieve optimum mixing. Generally, mixing is carried out at a temperature of at least about 10° C. above the melting point temperature of the microfiber forming resin and less than about the degradation temperature of the material to which the microfiber forming resin is added and/or the microfiber forming resin. Generally, mixing is carried out at a temperature between about 140° C. to about 170° C. However, higher temperatures may be used. It will be appreciated that if the polymer resin is provided in a form suitable for extrusion, the first extrusion step may be omitted, and the resin is added directly to extruder 312.

The appropriate resins for forming microfibers may also be added to the extruder 312 at downstream entrance 313 or another port (not shown). Preferably the microfiber forming resins are added separately from the other additives. The melt-mixing step prepares a composition in which the microfiber forming material and other additives are distributed throughout a molten polymer resin. Typically, the melt-mixing operation uses at least one kneading block downstream from entrance 313 to obtain adequate mixing of the various components. The temperature, pressure, shear rate, and mixing time employed during melt-mixing are selected to prepare a void-free extrudable composition suitable for use as a tape and/or as a core layer that is part of a multilayer tape. The order of addition, zone temperatures, pressures, shear rates, and mixing times are also selected based upon the particular chemical compositions being processed, and the selection of these conditions is within the skill of those practicing in the field. When the tape includes a fire retardant(s), the preferred order of addition is polymer resin/adhesive, fire retardant(s) and other additives, if any, microfiber forming resin, and tackifier, if any.

The reinforcing microfibers are desirably formed with material having a melt viscosity (as determined with a capillary viscometer) similar to the melt viscosity of the polymer core material at the die 314 temperature of the above method. The reinforcing microfiber material is selected to be immiscible in, but compatible with the polymer material. The physical properties of the stretch releasable tape are affected by how well the microfibers are formed, and the formation of the microfibers are affected by the processing conditions and compatibility with the core layer polymer resin. It is important that the melt viscosities of the microfiber forming resin and the core polymer are closely matched and processing conditions are right to generate continuous microfibers. Typically the ratio of the melt viscosities of the microfiber forming resin and the core polymer is from about 1:30 to about 30:1 and preferably, from about 1:20 to 20:1. The microfiber material is typically melted, mixed and dispersed in the core material as substantially spherical resin droplets. These droplets generally have an average diameter less than about 20 micrometers and sometimes less than about 10 micrometers.

Following melt mixing, the resulting extrudable composition is metered into an extrusion die 314 (e.g., a contact or drop die) through transfer tubing 318 using a gear pump 316. The temperature within die 314 is maintained at substantially the same temperature as the temperature within transfer tubing 318. While the temperature within tubing 318 will be elevated, it is generally maintained low enough to avoid degradation of the polymer or the components.

The pressure within the die 314 will generally decreases as the polymer core composition approaches the exit port 315 of the die 314. The flow rate of the extrudable polymer composition through the extruder 312 and the die 314 is maintained to adequately process the core layer, as known by those skilled in the art. The manufacturing process temperatures are typically chosen so that the temperature of the highest or last zone is between at least about 10° C. above the melting point (low limit) of elastic, viscoelastic, or combination of elastic and viscoelastic polymer resins and less than about the degradation temperature of the components. Moreover, the temperature of the die 314 is generally no greater than about 60° C. over the melting point of the microfiber forming polymer so that the microfiber can effectively consolidate by crystallizing upon cooling into relatively long, substantially continuous microfibers.

The smoothness of one or both of the major surfaces of the tape core layer, and/or adhesive layers can be increased by using a nip roll to press the core against a smooth chill roll 317 after the core exits die 314, or by using smooth liners on each of the major surfaces of the multilayered tape and passing the composite article through a nip. It is also possible to emboss a pattern on one or both major surfaces of the multilayered tape by using a patterned or microstructured liner such as those described in U.S. Pat. No. 6,197, 397 issued to Sher et al. on Mar. 6, 2001 or by contacting the tape with a patterned roll, for example, a patterned chill roll, after it exits the die 314.

The core layer may be combined with one or more skin adhesive layers. FIG. 4 shows a co-extrusion process for use in the present invention. In the depicted system, a layer of skin adhesive material is introduced to the system by adding a resin or adhesive polymer to the extruder 330 (e.g., a single screw extruder). Within the extruder 330, the resin or adhesive material is softened, mixed, or melted and then fed to a second extruder 332 (e.g., a single or twin screw extruder). Additives such as the microfiber resins, tackifiers, fire retardants, etc. may be also be included in the skin adhesive by adding the additional components to the extruder 332 at downstream port 329 where the additives are mixed with the adhesive material. Preferably the microfiber forming resins are added separately from the other additives. The melt-mixing step prepares a composition in which the microfiber forming material and other additives are distributed throughout a molten adhesive polymer resin. Typically, the melt-mixing operation uses at least one kneading block downstream from entrance 329 to obtain adequate mixing of the various components. The temperature, pressure, shear rate, and mixing time employed during melt-mixing are selected to prepare a void-free extrudable composition suitable for use as an adhesive skin layer. The additives, the order of their addition, zone temperatures, pressures, shear rates, and mixing times are also selected based upon the adhesive formulation, and the selection of these conditions is within the skill of those practicing in the field. When the skin adhesive includes a fire retardant(s), the preferred order of addition is polymer resin/adhesive, fire retardant(s) and other additives, if any, microfiber forming resin, and tackifier, if any. The number of additives, the order of their addition, and their point of addition are selected based on the adhesive formulation to provide desired adhesive properties suitable for the intended application of the final tape product Following mixing, an extrudable adhesive composition is metered from the extruder 332 to the appropriate chambers of die 314 through transfer tubing 334 using gear pump 336. The adhesive composition is co-extruded with the core layer through an exit port 315 on the die 314 so that the adhesive composition is applied directly to one of the major surfaces of the core layer. It will be appreciated that an adhesive composition may be applied to the core layer on either or both of the major surfaces. Co-extrusion methods for coating an article with adhesive are known to those in the art and are not further explained here.

Where skin adhesive is to be applied to both of the two major surfaces of the core layer, the resulting tape is a three-layer (ABA or ABC) construction of the kind illustrated in FIG. 2 and described herein. For the manufacture of such a three layer ABC construction, additional extruders and related equipment may be added to the system of FIG. 3 in a known manner to permit both first and second skin adhesives to be applied to the first and second major surfaces of the core layer. Alternatively, one or both of the adhesive compositions may be applied to the core layer by lamination, by coating, or by spraying the adhesive onto the core. The first and second adhesives may be continuous or discontinuous adhesive layers applied to the major surfaces of the core layer, and the skin adhesives may be the same or different adhesive compositions on each of the major surfaces, and either of the adhesive layers may be provided with a three dimensional surface structure. Preferably, for stretch release properties, the skin adhesive has a peel adhesion strength that is less than the tear or tensile break strength of the core layer or composite tape construction.

Suitable skin adhesives for use in the articles of the present invention include any adhesive that provides acceptable adhesion to a variety of polar and non-polar substrates while also being compatible with the composition used in the core layer in the manner described herein. The thickness of the skin adhesive has an effect on peel adhesion. Consequently, the thickness of the skin adhesive should be at least about 0.012 mm (0.5 mil), and typically, at least about 0.051 mm (2 mils), and generally, less than 0.25 mm (10 mils). For clean removability of the stretch release tape in one step, it is preferred that the skin adhesive not adhere too strongly to a substrate, i.e., have a 90 degree peel adhesion less than about 5.25 kN/m (30 lbs/in), preferably less than about 3.50 kN/m (20 lbs/in) and more preferably less than about 1.75 kN/m (10 lbs/in). Pressure sensitive adhesives are generally acceptable and may be desired. Suitable pressure sensitive adhesives include any of a variety of adhesives such as those based on acrylic adhesives (including copolymers, terpolymers, and tetrapolymers of (meth)acrylate(s) and comonomers such as (meth)acrylic acid, vinyl acetate, and dimethyl acrylamide), polyurethanes, thermoplastic elastomers such as styrene-isoprene-styrene, styrene-butadiene-styrene, and combinations thereof, and other block copolymers, polyolefins such as poly-alpha-olefins and amorphous polyolefins, silicones, rubber based adhesives (including natural rubber, polyisoprene, polyisobutylene, butyl rubber etc.) and combinations and blends of the foregoing adhesives. The adhesive component may contain tackifiers, plasticizers, rheology modifiers, adhesion promoters such as silanes, fillers, non-polymeric fibers, crosslinking agents, ceramic microspheres, glass microspheres, expanded and unexpanded polymeric microspheres, conductive particulates (thermally and/or electrically conductive), antistatic agents, antioxidants, dyes, pigments, stabilizers, blowing agents, surfactants, nanoparticles such as nanoclays, microfiber forming resin, and other additives as well as active components such as an antimicrobial agent or the like. A group of pressure sensitive adhesives known to be useful in the present invention are, for example, the acrylate copolymers described in U.S. Pat. No. RE 24,906, and particularly a copolymer comprising a weight ratio of from about 90:10 to about 98:2 iso-octyl acrylate:acylic acid copolymer and a copolymer comprising a weight ratio of from about 90:10 to about 98:2 2-ethylhexyl acrylate:acylic acid copolymer. Also acceptable is an 65:35 2-ethylhexyl acrylate:isobornyl acrylate copolymer. Useful adhesives are described in U.S. Pat. Nos. 5,804,610 and 5,932,298, both of which are incorporated herein in their entireties by reference thereto, and a blend of acrylic adhesive and rubber based adhesive, such as identified as Hot Melt Composition K in PCT International Publication WO 01/57152. The inclusion of antimicrobial agents in the adhesive is also contemplated, such as is described in U.S. Pat. Nos. 4,310,509 and 4,323,557 both of which are incorporated herein in their entireties by reference thereto.

A release liner 320 may be applied to the skin adhesive layer or layers associated with either or both of the major surfaces of the core layer. A release liner 320 can be dispensed from a feed roll 322 and applied to a surface of the skin adhesive. Suitable materials for liner 320 include silicone release liners, polyester films (e.g., polyethylene terephthalate films), and polyolefin films (e.g., polyethylene films). The liner and the adhesive may be laminated together between nip rollers 324. A second optional release liner 340 may be applied to the other major surface of the core layer. The liner 340 may be dispensed from a second feed roll 342 which feed the liner 340 to the nip roll 324. The liner is then applied to the adhesive layer as the core and associated adhesive pass between nip rolls 324. The pressure from the nip rolls 324 serves to laminate the release liners 320 and 340 to the multi-layer tape construction.

In another manner of attachment, the second release liner 340 may be provided with a layer of an adhesive coated or applied to one surface of the release liner 340. In this manner, the second adhesive layer may be applied to the second major surface of the core material. The second adhesive layer may be the same as or different from the aforementioned co-extruded adhesive. Typically, the adhesive layers will comprise pressure sensitive adhesives. The adhesive layers may or may not contain microfibers. Release liner 320 may also be provided with a layer of an adhesive coated or applied to one of its surfaces.

Alternatively, the liner 340 can be dispensed from a feed roll (not shown) and applied to the surface of the chill roll 317 such that extrudate from die 314 is coated onto liner 340.

Following lamination between the nip rolls 324, the tape is optionally exposed to radiation from an electron beam source 326, for example, to crosslink the polymeric core and/or to crosslink the adhesive layer(s). Where the core material requires crosslinking for improved cohesive strength, the radiation should be energetic enough to penetrate the thickness of the core to initiate and complete the crosslinking reaction. As known by those skilled in the art, the extruded core layer may be of a thickness that irradiation by e-beam exposure is needed on both sides of the core for adequate crosslinking. Other sources of radiation (e.g., ion beam, gamma radiation, and ultraviolet radiation) may be used, and the less energetic forms of radiation may be suitable if only the outermost layer (e.g., an adhesive layer) requires crosslinking. Following exposure to e-beam or other radiation source, the resulting multilayer tape laminate is rolled up onto a take-up roll 328. Optionally, the tape can be wound into a roll and subsequently irradiated.

The release liners are typically coated with release agents such as fluorochemicals or silicones. For example, U.S. Pat. No. 4,472,480 describes low surface energy perfluorochemical liners. Suitable release liners include papers, polyolefin films, or polyester films coated with silicone release materials. Examples of commercially available silicone coated release liners are POLYSLIK™ silicone release papers available from James River Co., H.P. Smith Division (Bedford Park, Ill.) and silicone release papers supplied by DCP-Lohja (Dixon, Ill.) now known as Loparex Inc. (Willowbrook, Ill.). A particular release liner is that known by the designation 1-60BKG-157, a super calendared Kraft paper with a water-based silicone release surface, available from Daubert Chemical Co. Other types of stable, contaminent free, release liners are also useful in the invention such as those described in U.S. patent application Ser. No. 09/775,955 incorporated herein by reference.

The foregoing co-extrusion process can be conducted so that a two-layer article is produced, or so that articles having three or more layers are produced. Such multi-layered constructions can be accomplished by equipping die 314 with an appropriate feed block, or by using a multi-vaned or multi-manifold die. While an extrusion process has been described for preparing tape according to the invention, multilayered tapes can also be prepared by laminating, coating, or spraying skin adhesive layers or other additional polymer layers to the core layer, or to any of the co-extruded polymer layers after the core exits die 314. For example, the core layer can be extruded directly onto a backing layer or onto a release liner bearing a skin adhesive layer. Other techniques which can be used include pattern coating. It is preferred that tape 200 be prepared by the processes described in U.S. Pat. No. 5,660,922, issued Aug. 26, 1997.

The tapes of the invention are useful in a variety of applications, and are especially useful as carpet tape in aerospace, electronic, automotive, and medical applications as well as in advertising and displays. The properties of the articles may be tailored to meet the demands of the desired applications. The tapes can also be used as attachment systems for or as a means for mounting a wide variety of articles such as signage, reclosable fasteners, body side molding, panels, hooks, clips, and the like. Additional applications include closure applications such as container closures, diaper closures, and surgical drape closures.

The features of the embodiments of the invention are further illustrated in the following non-limiting examples.

EXAMPLES

All amounts listed in the Examples are by weight unless otherwise specified. In the test methods and examples below, all the sample dimensions (typically the length) are approximate dimensions except for the width wherein the width was measured to the accuracy of the cutting tool.

Test Methods
Flammability Test Method

This test method is based on the criteria and procedures for showing compliance with F.A.R. § 25.853 (July 1990) but differs from F.A.R. § 25.853 (July 1990) in that the specimens (samples) were conditioned at 50%±10% relative humidity for a minimum of 24 hours instead of the specified 50%±5%.

Samples were conditioned to 21.1° C.±2.8° C. (70°±5°F.) and at 50%±10% relative humidity for a minimum of 24 hours. Specimens were mounted into a U-shaped metal frame so that the two long edges and one narrow edge were held securely in a vertical orientation, unsupported by and unattached to a substrate. The exposed area of the specimen was at least 50.8 mm (two inches) wide and about 304.8 mm (12 inches) long.

The samples were exposed to the flame from a Bunsen burner. The lower edge of the sample was about 19.1 mm (¾ inch) above the top edge of the burner. The flame was applied to the center line of the lower edge of the sample for 12 seconds. The flame time, burn length, and flaming time of dripping, if any, was recorded. Burn length was the distance from the original edge of the sample that was exposed to the flame to the point which is the farthest evidence of damage to the test specimen due to flame impingement including area of partial or complete consumption, charring, or embrittlement, but not including areas sooted, stained, warped, or discolored, nor areas where material had shrunk or melted away from the heat.

F.A.R. § 25.853 (July 1990) subparagraphs (a)(1)(i) 60 second flame exposure require that the average burn length not exceed 152.4 mm (six inches), the average flame time after removal of the flame source not exceed 15 seconds, and drips not continue to flame for more than an average of 3 seconds after falling. F.A.R. § 25.853 (July 1990) subparagraphs (a)(1)(ii) 12 second flame exposure require that the average burn length not exceed 203 mm (8 inches), the average flame time after removal of the flame source not exceed 15 seconds, and drips not continue to flame for more than an average of 5 seconds after falling.

90 Degree Peel Adhesion Test

A 12.7 mm (one-half inch) wide by about 152 mm (6 inches) long sample was cut from the article to be tested and laminated to an about 165 mm (6.5 inches) long by about 28.6 mm (1.125 inches) wide by 0.051 mm (0.002 inches) thick aluminum foil by rolling down the article onto the aluminum foil, taking care not to trap air bubbles between the foil and the article. The foil/article laminate was then positioned on a clean, dry, 51 mm (two inches) wide by about 127 mm (5 inches) long, substrate panel of stainless steel or to a Boeing composite, as specified in the Examples below, so that the laminate was centered on the panel with a portion of the laminate extending off the panel to serve as a tab. The laminate was rolled down onto the panel using a 2 kg (4.5 lb) hard rubber roller, with two passes in each direction. Care was taken not to trap bubbles between the panel and the laminate. The sample thus prepared was allowed to dwell at room temperature (about 22° C.) or at 70° C. for about 72 hours. Then the sample was tested at room temperature (about 22° C.) for 90 Degree Peel Adhesion according to the Pressure Sensitive Tape Council test method PSTC-5 "Quick Stick of Pressure Sensitive Tapes" at crosshead speed of 30 cm/minute (12 inches/minute) using an INSTRON tensile tester. That is, the peel value obtained from the first 25.4 mm (one inch) length of peel was ignored. The peel value of the next 89 mm (3.5 inches) or "peel area" was recorded. The values reported were the integrated peel adhesion values. Failure mode was also noted for 70° C. aged samples.

T-Peel Adhesion Test

A 12.7 mm (one half inch) wide by about 152 mm (6 inches) long sample was cut from the article to be tested and laminated to an about 165 mm (6.5 inches) long by about 28.6 mm (1.125 inches) wide by 0.051 mm (0.002 inches) thick aluminum foil by rolling down the article onto the aluminum foil, taking care not to trap air bubbles between the foil and the article. The foil/article laminate was then positioned on a clean, dry, 51 mm (two inches) wide by about 127 mm (5 inches) long, back of a carpet panel, FELTEX CARPET Style 282131, available from Feltex Carpet Ltd, Auckland, NZ, so that the laminate was centered on the carpet back with a portion of the laminate extending off the carpet back to serve as a tab. The laminate was rolled down onto the carpet back using a 2 kg (4.5 lb) hard rubber roller, with two passes in each direction. Care was taken not to trap bubbles between the carpet back and the laminate. The sample thus prepared was allowed to dwell at room temperature (about 22° C.) or at 70° C. for about 72 hours. Then the sample was tested at room temperature (about 22° C.) according to ASTM D-1876-01 "Peel Resistance of Adhesives (T-Peel Test)" at crosshead speed of 30 cm/minute (12 inches/minute) using an INSTRON tensile tester. The peel value obtained from the first 25.4 mm (one inch) length of peel was ignored. The peel value of the next 89 mm (3.5 inches) or "peel area" was recorded. The values reported were the integrated peel adhesion values.

Static Shear Strength Test

A 1.27 cm (one-half inch) wide by about 15.2 cm (6 inches) long sample was cut from the article to be tested and laminated to a sheet of anodized aluminum foil (about 16.5 cm (6.5 inches) long by 2.86 cm (1.125 inches) wide by 0.0127 cm (0.005 inches) thick) by rolling down the article onto the anodized side of the aluminum foil, taking care not to trap air bubbles between the foil and the article. The foil/article laminate was then cut in half to give two about 2.54 cm×about 7.62 cm (1 inch×3 inches) test specimens. The liner was removed from a test specimen and then positioned on a clean, dry, 5.1 cm (two inches) wide by 12.7 cm (5 inches) long, stainless steel substrate panel so that the laminate was centered on one end of the panel so that 2.54 cm (1 inch) length was adhered (i.e. 3.13 sq. cm (0.5 sq. inch) bond area) and the 5.1 cm (2 inches) portion of the laminate extended off the panel to serve as a tab. The laminate was rolled down onto the panel using a 2 kg (4.5 lb) hard rubber roller, with two passes in each direction. Care was taken not to trap bubbles between the panel and the laminate. The 5.1 cm (2 inches) tab was then folded around a triangular clip and stapled so that a weight could be attached to the test specimen. The sample thus prepared was allowed to dwell at room temperatures and approximately 50% relative humidity for approximately 72 hours. The test specimen was then placed in a Static Shear standard fixture having between zero and 2 degree angle back slant in a forced air oven set at 70° C. (158° F.). The test specimen was then given a 10 minute warm up period before attaching a 500 gram weight. The test was run until the test specimen failed or 10,000 minutes elapsed. Failure time and failure mode were recorded. Where the test specimen did not fail, the amount of slippage was measured and recorded.

Tensile Break Strength & Elongation Test

A silicone release liner was applied to the exposed surface of the article which already had a liner on one side. A 2.54 cm (one inch) wide by about 12.7 cm (5 inches) long sample was cut in the machine direction from the article to be tested to form the test specimen. One release liner was removed and a 2.54 cm (1 inch) length was measured and marked in the center of test specimen to provide the initial gap distance. A 2.54 cm (1 inch) wide by about 7.62 cm (3 inch) piece of masking tape was placed across the foam article by positioning the tape edge on both marks so that the 2.54 cm (1 inch) long section that was marked off did not have tape covering it. The other liner was then removed, and masking tape was wrapped completely around the article. Care was taken to keep the masking tape aligned with the marks on the article. The tape was used to prevent the sample from adhering to the INSTRON jaws and prevent the sample from breaking at the point where it was clamped by the jaws. The INSTRON was set up with the following conditions:

Jaw Gap: 2.54 cm (1 inch)

Crosshead Speed: 25.4 cm/minute (10 inches/minute)

The test specimen was then positioned in the INSTRON jaws so that the jaws lined up with the edge of the masking tape. The sample was tested at a crosshead speed of 25.4 cm/minute (10 inches/minute) until the sample broke. The tensile break strength was recorded in pounds (and later converted to kilograms) and elongation distance was recorded. The percent elongation was determined by dividing the elongation distance by the initial gap distance times 100. Three specimens were tested and averaged to provide the Tensile Break Strength and Percent Elongation.

Hardness Test

The thickness of an about 5.1 cm (two inches) by 2.54 cm (one inch) article sample was measured and recorded. The sample was then laminated to a clean, dry glass panel taking care to avoid trapping air bubbles between the sample and the glass. Additional pieces of article sample were laminated to the first article until a total thickness of at least 0.34 cm (0.135 inches) was achieved. Using a Shore A Hardness Tester (Model CV Stand and Durometer Type A ASTM D2240 Gauge available from Shore Instrument Mfg. Co. Inc., Freeport, N.Y.), the initial hardness of the article was measured three times and the maximum hardness values obtained were averaged.

Stretch Release Test

Two 12.5 mm (0.5 inch) wide by about 152 mm (6 inches) long strips were cut from the test sample such that the length was cut in the machine direction of the sample. Two strips were laminated side by side to a 50.8 mm (2 inch) wide×127 mm (5 inches) long×1.59 mm (1/16 inches) thick stainless steel panel such that the strips was centered down the middle of the panel with 1.27 cm (half inch) space between the strips and approximately 25.4 mm (1 inch) of the strip extends beyond the end of the panel. Care was taken to ensure maximum wet-out of or contact between the strip and the panel. It was desired that 100% contact be achieved. The bonded sample was allowed to dwell for between 24 and 72 hours at room temperature (about 22° C.). The free end of the test strips were pulled by hand at a speed of about 30 cm/minute (about 12 inches/minute) in a direction away from the panels to initiate stretch release removal until the bond failed. The test strips were pulled at an angle that was approximately between 10 and 25 degrees above the plane of the panel. The panels were then visually examined for the presence of residue and the number of times the strip broke.

Materials

Certain commercially available materials were used in the Examples of the invention. These materials are listed below and are often referred to in the Examples with reference to their trade designations.

| Trade Designation | Description | Source |
|---|---|---|
| IRGACURE 651 | 2,2-dimethoxy-2-phenylacetophenone | Ciba Specialty Chemicals Corp, Tarrytown, NY |
| FR 370 | tris(tribromoneopentyl) phosphate | Dead Sea Bromine Group, Beer Shiva, Israel |
| EXOLIT IFR 23 | intumescent flame-retardant system based on ammonium polyphosphate | Clariant Corporation, Charlotte, NC |
| HL2081 | rubber/resin pressure sensitive adhesive | H. B. Fuller, St. Paul, MN |
| SYVALITE RE80HP | tackifying resin | Arizona Chemical, Jacksonville, FL |
| ECR 180 | tackifying resin | ExxonMobil Chemical Company, Houston, TX |
| EXACT 3040 | ethylene-based hexene copolymer, nominal tensile yield strength (MD) 5.4 MPa (780 psi), tensile break strength (MD) 51.6 MPa (7490 psi), elongation at break (MD) 460%, MI 16.5, density 0.900 g/cm3, Peak Melting temperature 96° C. (205° F.). | ExxonMobil Chemical Company, Houston, TX |

General Preparation of Packaged Pressure Sensitive Adhesives I–III

Three pressure-sensitive adhesive compositions were prepared by mixing 2-ethylhexyl acrylate (2-EHA), acrylic acid (AA), 2,2-dimethoxy-2-phenylacetophenone (IRGACURE 651), and isooctyl thioglycolate (IOTG) in the amounts listed in Table 1 below. Each composition was formed into a "Packaged Pressure Sensitive Adhesive" by placing the composition into packages measuring approximately 100 mm by 50 mm by 5 mm thick as described in U.S. Pat. No. 5,804,610 (Hamer et al). The packaging film was 0.0635 mm (0.0025 inches) thick VA-24 film (a heat sealable, ethylene vinyl acetate copolymer film having 6% vinyl acetate, available from CT Film of Dallas, Tex.). The packages were immersed in a water bath and at the same time exposed to ultraviolet radiation at an intensity of 3.5 milliwatts per square centimeter and a total energy of 1627 millijoules per square centimeter as measured by NIST units to form a "Packaged Pressure Sensitive Adhesive (Pkg. PSA)".

TABLE 1

| Component | Parts by Wt. of 2-EHA | Parts by Wt. of AA | Parts by Wt. of IOTG | Parts by Wt. of 2,2-dimethoxy-2-phenylacetophenone |
|---|---|---|---|---|
| Pkg. PSA I | 90 | 10 | 0.03 | 0.15 |
| Pkg. PSA II | 97 | 3 | 0.01 | 0.15 |
| Pkg. PSA III | 95 | 5 | 0.01 | 0.15 |

Packaged Pressure Sensitive Adhesive IV

Packaged Pressure Sensitive Adhesive IV was a commercial hot melt adhesive available from H.B. Fuller Company under the designation HL2081.

Preparation of Precompounded Skin Adhesive A:

"Pkg. PSA I" was fed to the second feed port of a 30 mm co-rotating twin screw extruder (Werner Pfleider) operating at a screw speed of 300 rpm through a first 51 mm single screw extruder (Bonnot). The Bonnot zone temperatures were set at the following: Zone 1=149° C. (300° F.), Zone 2=163° C. (325° F.), and Zone 3=177° C. (350° F.). The pump and heated hose were set at 177° C. (350° F.). The temperature for the six zones in the twin screw extruder was set in Zone 1 at 163° C. (325° F.), and in Zones 2 through 6 at 121° C. (350° F.). The adhesive was delivered into a silicone coated paper box though a heated hose set at 121° C. (350° F.). The skin adhesive was identified as "Precompounded Adhesive A" as shown in Table 2 below.

Precompounded Skin Adhesive B:

Precompounded Adhesive B in Table 3 below was Pkg. PSA IV used as received from the manufacturer in the precompounded form of pillows ready for hot melt processing.

Preparation of Precompounded Skin Adhesives C–G:

Five skin adhesives containing fire retardants were precompounded as follows:

A Pkg. PSA was fed at a rate of 12 lbs/hr (5.45 kg/hr) to Barrel Zone 1 of a 30 mm co-rotating twin screw extruder (Werner Pfleider) operating at a screw speed of 300 rpm through a first 51 mm single screw extruder (Bonnot). The Bonnot zone temperatures were set at the following: Zone 1=149° C. (300° F.), Zone 2=163° C. (325° F.), and Zone 3=177° C. (350° F.). The pump and heated hose were set at 177° C. (350° F.). The temperature for the six zones in the twin screw extruder was set at Zone 1=37.8° C. (100° F.), Zones 2=79.4° C. (175° F.), Zones 3=37.8° C. (100° F.), Zones 4=160° C. (325° F.), Zones 5=160° C. (320° F.), and Zone 6=160° C. (320° F.).

The flame retardant(s) was added to Barrel Zone 3 using a KTRON weight loss feeder, Model No. F-7, available from K Tron Corp, Pitman, N.J.

If present, the tackifying resin(s) was melted in a resin melting system, and was added into Barrel Zone 5. The resin melting tank temperature was set at 148.9° C. (300° F.), and the pump and heated hose were set at 162.8° C. (325° F.). The feed rate for both the fire retardant(s) and tackifying resin(s), if present, was adjusted based on the set 12 lbs/hour (5.45 kg/hr) flow rate of the Pkg. PSA to give the desired level of parts in the formulation as shown in Table 2.

The adhesive was delivered into a silicone coated paper box though a heated hose set at 160° C. (320° F.). The skin adhesives were identified as "Precompounded Adhesive C, D, E, F and G" as shown in Table 2 below.

TABLE 2

| Compo- nent Type | Com- ponent | Precompounded Skin Adhesives, Parts by Wt. | | | | | | |
|---|---|---|---|---|---|---|---|---|
| | | A | B | C | D | E | F | G |
| Adhesive Polymer | Pkg. PSA I | 100 | | | | | | |
| | Pkg. PSA II | | | 100 | 100 | | 100 | 100 |
| | Pkg. PSA | | | | | 100 | | |

TABLE 2-continued

| Compo- nent Type | Com- ponent | Precompounded Skin Adhesives, Parts by Wt. | | | | | | |
|---|---|---|---|---|---|---|---|---|
| | | A | B | C | D | E | F | G |
| | III Pkg. PSA IV | 100 | | | | | | |
| Tackifying Resin | ECR 180 RE80HP | | 39 | 39 | | 39 | 49 | |
| Fire Retardant | EXOLIT IFR 23 FR 370 | | | 75 49 | 49 | | 75 | 50 |

Preparation of Compounded Core Adhesives H–N:

Seven core adhesives were compounded as follows:

A Pkg. PSA was fed at a rate of 2.27 kg/hr (5 lb/hr) to Barrel Zone 1 of a 30 mm co-rotating twin screw extruder (Werner Pfleider) operating at a screw speed of 300 rpm through a first 51 mm single screw extruder (Bonnot). The Bonnot zone temperatures were set at the following: Zone 1=149° C. (300° F.), Zone 2=163° C. (325° F.), and Zone 3=177° C. (350° F.). The pump and heated hose were set at 177° C. (350° F.). The temperature for the six zones in the twin screw extruder was set at Zone 1=37.8° C. (100° F.), Zone 2=37.8° C. (100° F.), Zone 3=37.8° C. (100° F.), Zone 4=160° C. (320° F.), Zone 5=160° C. (320° F.), and Zone 6=160° C. (320° F.).

If present, the flame retardant(s) was added to Barrel Zone 3 using a KTRON weight loss feeder.

The fiber forming resin was added to Barrel Zone 3 using a KTRON weight loss feeder. The feed rate for both the fire retardant(s), if present, and fiber forming resin was adjusted based on the set 2.27 kg/hr (5 lb/hr) flow rate of the Pkg. PSA to give the desired level of parts in the formulation as shown in Table 3.

The core adhesives were identified as "Compounded Core Adhesive H, I, J, K, L, M, and N" as shown in Table 3 below. The Compounded Core Adhesive was not isolated but was fed to the middle layer of a three layer die as described below in Examples 1–11.

TABLE 3

| Compo- nent Type | Com- ponent | Compounded Core Adhesive, Parts by Wt. | | | | | | |
|---|---|---|---|---|---|---|---|---|
| | | H | I | J | K | L | M | N |
| Adhesive Polymer | Pkg. PSA I | 100 | | | 100 | | | |
| | Pkg. PSA II | | | | | 100 | | |
| | Pkg. PSA III | | | 100 | 100 | | | 100 |
| | Pkg. PSA IV | | 100 | | | | | |
| Fiber Forming Resin | EXACT 3040 | 54 | 54 | 54 | 54 | 54 | 65 | 87 |
| Fire Retardant | EXOLIT IFR 23 FR 370 | | | 49 | 75 49 | | 75 | 75 |

Examples 1–11

Compounded Core Adhesive H–N were combined with Precompounded Skin Adhesives A–G to prepare three layer tapes as follows:

After a core adhesive was compounded as described above, it was pumped directly through a heated hose to the center/middle layer of an about 203.2 mm (8 inches) wide, three layer CLOEREN die (available from The Cloeren Company, Orange, Tex.) with a gap of about 1 mm (0.040 inches). The die temperature was 320° F. (160° C.).

Simultaneously, a Precompounded Skin Adhesive was fed to the each of the outer layers of the die from a second 51 mm single screw extruder (Bonnot) and coextruded with the core adhesive extrudate above. The Bonnot zone temperatures were all set at 149° C. (300° F.). The pump and heated hose were set at 163° C. (325° F.). The skin adhesive flow rate was adjusted to provide a target thickness of each outer layer of 0.076 mm (3 mils). The process conditions were adjusted to provide the tape thickness set forth in Table 4. The extruded sheet was cast onto a chill roll that was set at 7.2° C. (45.5° F.), cooled to about 25° C., and then transferred onto a 0.127 mm thick polyethylene release liner prepared according to Examples 10a and 10b of copending U.S. patent application Ser. No. 09/775,955 "Adhesive Article and Method of Preparing." The resulting article was wound into a roll for subsequent crosslinking.

Two approximately one meter (39 inches) long pieces were cut from the above sample roll. A 0.051 mm (0.002 inch) thick two sided, silicone-coated polyester liner, having different release materials (identified as 5035 and 7200) on each side, available from DCP-LOHJA Inc. Willowbrook, Ill. as 2-2PESTR(P2)-5035 & 7200, was carefully laminated to the uncovered side (Side 2) of each piece with the 7200 silicone coated side contacting the uncovered side (Side 2). The extruded sheet piece of Examples 1–3, and 6–11 with liners on both sides were then passed through the electron beam (e-beam) processing unit (ESI Electro Curtain) operating at an accelerating voltage of 300 keV and at a speed of 6.1 meters per minute, once on each side. Each piece received a measured e-beam dose of 6 megaRads on each side.

TABLE 4

| Ex. No. | Skin Adhesive, Side 1/ Side 2 | Thickness of Skin Adhesive Side 1/ Side 2, mm (mils) | Core Layer | Thickness of Core Layer, mm (mils) | Total Tape Thickness, mm (mils) | Total Tape Weight g/m$^2$ (oz/yd$^2$) |
|---|---|---|---|---|---|---|
| 1 | A/A | 0.076/0.076 (3/3) | H | 0.152 (6) | 0.30 (12) | 285.9 (8.43) |
| 2 | A/A | 0.076/0.076 (3/3) | H | 0.229 (9) | 0.38 (15) | 379.5 (11.19) |
| 3 | A/A | 0.076/0.076 (3/3) | H | 0.33 (13) | 0.48 (19) | 469.3 (13.84) |
| 4 | B/B | 0.076/0.076 (3/3) | I | 0.305 (12) | 0.46 (18) | 338.0 (9.97) |
| 5 | B/B | 0.076/0.076 (3/3) | I | 0.10 (4) | 0.25 (10) | 345.2 (10.18) |
| 6 | C/C | 0.076/0.076 (3/3) | J | 0.38 (15) | 0.53 (21) | 592.1 (17.46) |
| 7 | D/D | 0.076/0.076 (3/3) | K | 0.13 (5) | 0.28 (11) | 334.4 (9.86) |
| 8 | E/E | 0.076/0.076 (3/3) | L | 0.13 (5) | 0.28 (11) | 318.8 (9.40) |
| 9 | F/F | 0.076/0.076 (3/3) | M | 0.36 (14) | 0.51 (20) | 554.8 (16.36) |
| 10 | G/G | 0.076/0.076 (3/3) | M | 0.20 (8) | 0.36 (14) | 410.3 (12.10) |
| 11 | F/F | 0.076/0.076 (3/3) | N | 0.28 (11) | 0.43 (17) | 494.4 (14.58) |

The resultant article was then tested for physical properties, and adhesive performance properties. Results are given in Table 5.

TABLE 5

| Example | Tensile Break Strength, MPa (psi) | % Elongation | Shore A Hardness | 90 Degree Adhesion, kN/m (piw) | | Static Shear at 70° C. minutes, failure mode | Stretch Release, Sample 1/ Sample 2 |
|---|---|---|---|---|---|---|---|
| | | | | Stainless Steel | Boeing Composite | | |
| 1 | 0.059 (8.6) | 710 | 49–30[e] | 1.27 (7.26) | 1.03 (5.89) | >10,000 | pass/fail[d] (1 break) |
| 2 | 0.066 (9.7) | 760 | 23 | 1.58 (9.00) | 1.28 (7.34) | >10,000 | pass/pass |
| 3 | 0.069 (10.1) | 840 | 21 | 1.87 (10.7) | 1.61 (9.19) | >10,000 | pass/pass |
| 4 | 0.069 (10.0) | 1270 | 41 | 1.86 (10.64) | NT[b] | <1 C.[c] | pass/pass |
| 5 | 0.048 (7.0) | 1050 | 35 | 1.41 (8.04) | NT | <1 C. | pass/pass |
| 6 | 0.078 (11.4) | 840 | 30 | 0.070 (3.98) | 0.56 (3.21) | 69 C. | pass/fail (2 breaks) |
| 7[a] | 0.019 (2.8) | 600 | 21 | 0.84 (4.81) | 0.92 (5.28) | 43 C. | fail/fail (5 breaks/ 3 breaks) |
| 8 | 0.068 (9.9) | 880 | 42 | 0.95 (5.45) | 1.31 (7.51) | >10,000 | pass/pass |
| 9 | 0.075 (10.9) | 730 | 42 | 0.64 (3.68) | 0.45 (2.59) | 992 C. | pass/fail (3 breaks) |
| 10 | 0.070 (10.2) | 720 | 50–48[e] | 0.36 (2.06) | 0.30 (1.73) | >10,000 | pass/pass |
| 11 | 0.088 (12.9) | 830 | 41 | 0.47 (2.71) | 0.525 (3.00) | 51 C. | pass/pass |

[a]Example 7 was very poorly coated with void and bubbles in the construction which affected the test properties.
[b]NT = not tested.
[c]C = cohesive failure
[d]Presence of void in the core layer caused failure.
[e]Dial reading constantly decreased during testing; reading did not reach a level point.

For the 90 Degree Adhesion test, all samples detached cleanly from the surface of the test substrate without leaving a visible residue. Examples 4 and 5 have both rubber based skin adhesive layers and a rubber based adhesive core layer and would not be expected to have good shear at 70° C. The tensile break strength of the tape can be increased by increasing the concentration of the microfibers and/or the thickness of the core layer to prevent breaking during the Stretch Release Test for the tapes of Examples 1, 6, 7 and 9.

Examples 6–11

Flammability

The tapes of Examples 6–11 were tested for flammability according to Flammability Test Method. Data is set forth in Table 6.

TABLE 6

| | | 12 Second Vertical Burn Results | | | |
|---|---|---|---|---|---|
| Example | Drippings | Dripping Burn Time, seconds | Flame Time, seconds | Burn Length, mm (inches) | Overall, Pass/Fail |
| 6 | Yes | 0 | 4.6 | 96.5 (3.8) | pass |
| 7 | Yes | 0 | 13 | 139.7 (5.5) | pass |
| 8 | Yes | 0 | 0 | 103.6 (4.08) | pass |
| 9 | Yes | 0 | >15 | >203.2 (>8) | fail |

TABLE 6-continued

| | | 12 Second Vertical Burn Results | | | |
|---|---|---|---|---|---|
| Example | Drippings | Dripping Burn Time, seconds | Flame Time, seconds | Burn Length, mm (inches) | Overall, Pass/Fail |
| 10 | Yes | 0 | >15 | >203.2 (>8) | fail |
| 11 | Yes | 0 | >15 | >203.2 (>8) | fail |

It is believed that the flammability of Examples 9, 10, and 11 could be improved by reducing the amount of tackifying resin used, by increasing the total amount of fire retardant, and by substituting a brominated fire retardant, such as FR 370, for a portion of IFR 23 fire retardant.

Example 12

A fire retardant, cleanly removable carpet tape as shown in FIG. 3 was prepared as follows:

The skin adhesive is identified as "Compounded Skin Adhesive 0" and the core adhesive is identified as "Compounded Core Adhesive P". Both the skin and core adhesives were not isolated, but were individually feed to a rotary die and coated onto a release liner.

Preparation of Compounded Skin Adhesive and Skin Adhesive Layer O:

Pkg. PSA II was fed at a rate of 2.27 kg/hr (5 lbs/hr) to Barrel Zone 1 of a 30 mm co-rotating twin screw extruder (Werner Pfleider) operating at a screw speed of 300 rpm through a first 51 mm single screw extruder (Bonnot). The Bonnot zone temperatures were set at the following: Zone 1=149° C. (300° F.), Zone 2=163° C. (325° F.), and Zone 3=177° C. (350° F.). The pump and heated hose were set at 177° C. (350° F.). The temperatures for the six zones in the twin screw extruder were set at Zone 1=37.8° C. (100° F.), Zones 2=37.8° C. (100° F.), Zones 3=37.8° C. (100° F.), Zones 4=160° C. (320° F.), Zones 5=160° C. (320° F.), and Zone 6=160° C. (320° F.).

The fire retardants, EXOLIT IFR 23 and FR 370, were added to Barrel Zone 3 using a KTRON weight loss feeder. The tackifying resin, RE 80 HP, was melted in a HELICONE resin melting system, and added into Barrel Zone 5. The HELICONE tank temperature was set at 148.9° C. (300° F.), and the pump and heated hose were set at 162.8° C. (325° F.). The feed rates for both the fire retardants, and tackifying resin were adjusted based on the set 2.27 kg/hr (5 lbs/hr) flow rate of the Pkg. PSA II to give the desired level of parts in the formulation as shown in Table 7 below.

After the skin adhesive was compounded as described above, it was not isolated, but pumped directly through a heated hose to an about 203.2 mm (6 inches) wide, rotary rod die set at about 160° C. (320° F.). It was coated directly onto a differential release, silicone coated, 55# densified kraft paper liner at target 0.125 mm (5 mils) thickness to provide Skin Adhesive Layer O, and wound into a roll.

Preparation of Compounded Skin Adhesive and Skin Adhesive Layer P:

Pkg. PSA III was fed at a rate of 1.36 kg/hr (3 lbs/hr) to Barrel Zone 1 of a 18 mm co-rotating twin screw extruder (Haake Micro 18, available from Haake, Karlsuhe, Germany) operating at a screw speed of 200 rpm through a first 51 mm single screw extruder (Bonnot). The Bonnot zone temperatures were all set at 121° C. (250° F.). The pump and heated hose were set about 149° C. (300° F.). The temperatures for the zones in the twin screw extruder were all set at about 121° C. (250° F.).

The fire retardant FR 370 was added to Barrel Zone 3 using a weight loss feeder. The tackifying resin, RE 80 HP, was melted in a DYNAMELT S222-G29-24-ZN grid melting system, available from ITW Dynatec, Hendersonville, Tenn., and added into Barrel Zone 5. The grid was set at 148.9° C. (300° F.), and the pump and heated hose were set at 162.8° C. (325° F.). The feed rates for both the fire retardant, and tackifying resin were adjusted based on the set 1.36 kg/hr (3 lbs/hr) flow rate of the Pkg. PSA III to give the desired level of parts in the formulation as shown in Table 7 below.

After the skin adhesive was compounded as described above, it was not isolated, but pumped directly through a heated hose to an about 203.2 mm (6 inches) wide, rotary rod die set at about 149° C. (300° F.). It was coated directly onto a differential release, silicone coated, 55# densified kraft paper liner at target 0.125 mm (5 mils) thickness to provide a Core Layer P and wound into a roll.

TABLE 7

| Component Type | Component | Adhesive Composition, Parts by Wt. | |
|---|---|---|---|
| | | Skin Adhesive Layer O | Skin Adhesive Layer P |
| | Pkg. PSA II | 100 | |
| | Pkg. PSA III | | 100 |
| Tackifying Resin | RE80HP | 40 | 39 |

TABLE 7-continued

| Component Type | Component | Adhesive Composition, Parts by Wt. | |
|---|---|---|---|
| | | Skin Adhesive Layer O | Skin Adhesive Layer P |
| Fire Retardant | EXOLIT IFR 23 | 13.33 | |
| | FR 370 | 66.67 | 49 |

Preparation of Fire Retardant, Multilayer Tape

Approximately one meter (39 inches) long pieces of each of the Skin Adhesive Layers O and P were cut from the above rolls. The differential release, silicone coated, 55# densified kraft paper liner, described above, was carefully laminated to the uncovered side (Side 2) of each piece. The sample, with liners on both sides, was then passed through the electron beam (e-beam) processing unit (ESI Electro Curtain) operating at an accelerating voltage of 180 keV and at a speed of 6.1 meters per minute, once on each side. Each piece received a measured e-beam dose of 8 megaRads on each side.

After removing a liner to expose one side of the skin adhesive layer P, the exposed side was laminated to one side of a 0.025 mm (1 mil) thick polyester film which was used as the core layer using a 2 kg (4.5 lb) rubber roller. In a similar manner, the skin adhesive layer O was laminated to the other or second side of the polyester film to form a multilayer tape.

The tape (without liners) was tested for weight, flammability, and tensile strength according to Boeing Test Method BMS 5-133C. The thickness of the tape was 0.30 mm (11 mils).

TABLE 8

| BMS 5-133C Test, Type IV, Class 2 | Result | Requirement |
|---|---|---|
| A. Weight oz/yd2, max. | 8.8 | 9.0 |
| B. Flammability | | |
| (a) Extinguish Time, sec., max. | 12 | 15 |
| (b) Burn Length, inches, max. | 5.5 | 8 |
| (c) Drip Extinguishing Time, sec., max. | 0 | 5 |
| C. Tensile Strength[a], lb/in, minimum | 29.5 | 30.0 |

[a]measured at a crosshead speed of 2.54 cm/min.

It is believed that use of a thicker polyester film in the above tape would provide a tape that would meet the tensile strength requirement.

Examples 1–3, 6–12

T-Peel Adhesion and 90 Degree Peel Adhesion

The tape of Example 12, along with the tapes of Examples 1–3, and 6–11, were tested for T-peel adhesion at room temperature(RT) and after aging at 70° C. for 72 hours; and 90 degree peel adhesion to Boeing floor panel BMS 4-2, Type II, from M.C. Gill, El Monte, Calif., at both room temperature and after aging for 72 hours at 70° C. Results are in Table 9.

TABLE 9

| Example | T-Peel Adhesion to Carpet Back, kN/m (piw) | | 90 Degree Peel Adhesion to Boeing Floor Panel, kN/m (piw) | | Failure Mode of 70° C. Aged Sample |
|---|---|---|---|---|---|
| | RT | Aged at 70° C. | RT | Aged at 70° C. | |
| 1 | 0.11 (0.6) | 0.14 (0.8) | 1.04 (5.89) | 2.08 (11.81) | stringy, cohesive of adhesive and/or core |
| 2 | 0.14 (0.8) | 0.16 (0.93) | 1.29 (7.34) | 2.2 (12.5) | sl. stringy, clean peel |
| 3 | 0.21 (1.2) | 0.21 (1.2) | 1.62 (9.19) | 2.66 (15.1) | stringy |
| 6 | 0.14 (0.8) | 0.13 (0.74) | 0.57 (3.21) | 0.65 (3.67) | clean peel |
| 7 | 0.25 (1.4) | 0.37 (2.1) | 0.93 (5.28) | 0.94 (5.34) | clean peel |
| 8 | 0.07 (0.4) | 0.09 (0.49) | 1.32 (7.51) | 0.77 (4.36) | cohesive split of core layer |
| 9 | 0.14 (0.8) | 0.18 (1.025) | 0.46 (2.59) | 0.80 (4.56) | clean peel |
| 10 | 0 (0) | 0 (0) | 0.30 (1.72) | 0.37 (2.1) | clean peel |
| 11 | 0.14 (0.8) | 0.14 (0.78) | 0.53 (3.0) | 0.56 (3.175) | clean peel |
| 12 | 0.14 (0.78) | 0.15 (0.875) | 0.38 (2.16) | 0.47 (2.69) | clean peel |

For the 90 Degree Adhesion RT test, all samples detached cleanly from the test substrate without leaving a visible residue.

From the data it can be see that for Examples 1–3, there is significant increase in adhesion to the Boeing floor panel after 70° C. aging compared to room temperature adhesion values. It is believed that this indicates better wet out of the substrate by these Examples compared to the other Examples tested. In addition, it is believed that Examples 1–3 would provide tapes that would be especially useful for general mounting applications where it is desirable to remove the tape after use. It is also believed that a decrease in the amount of fiber forming resin in Example 8 would improve the cohesive strength of the core.

While the features of the preferred embodiments of the invention have been discussed and described in detail, it will be appreciated that modifications to the described embodiments may be made by those skilled in the art, and such modifications and changes are within the scope and spirit of the invention as further set forth in the appended claims.

We claim:

1. A fire retardant, multi-layer carpet tape, comprising:
   a first adhesive layer comprising a first pressure sensitive adhesive;
   a second adhesive layer comprising a second pressure sensitive adhesive;
   a core layer disposed between said first adhesive layer and said second adhesive layer;
   a fire retardant disposed in at least one of the first adhesive layer or the second adhesive layer, the fire retardant being essentially free of antimony fire retardants and polybrominated biphenyls;
   reinforcing microfibers disposed in the core layer, the reinforcing microfibers oriented in the machine direction of the core layer and providing stretch release properties to the carpet tape; and
   the tape capable of passing (1) F.A.R.§ 25.853 (July 1990), 12 Second Vertical Burn Test; and being cleanly removable.

2. The fire retardant, multi-layer carpet tape of claim 1 wherein the core layer comprises a fire retardant, the fire retardant being essentially free of antimony fire retardants and polybrominated biphenyls.

3. The fire retardant, multi-layer carpet tape of claim 1 wherein the fire retardant is selected from the group consisting of an intumescent fire retardant, brominated phosphate fire retardant, and combinations of the foregoing.

4. The fire retardant, multi-layer carpet tape of claim 1 further comprising a release liner adjacent to the first adhesive layer, the second adhesive layer or both the first and second adhesive layers.

5. The fire retardant, multi-layer carpet tape of claim 1, wherein the microfibers are selected from the group consisting of elastic microfibers, viscoelastic microfibers, or combination of elastic microfibers and viscoelastic microfibers.

6. The fire retardant, multi-layer carpet tape of claim 1, wherein the reinforcing microfibers are unbroken for at least about 0.5 centimeters in the machine direction of the core layer.

7. The fire retardant, multi-layer carpet tape of claim 6, wherein the reinforcing microfibers are unbroken for at least about 5 centimeters in the machine direction of the core layer.

8. The fire retardant, multi-layer carpet tape of claim 6, wherein the reinforcing microfibers have a maximum diameter within the range from about 0.05 to about 5 micrometers and an aspect ratio greater than about 1000.

9. A method for the manufacture of a tape, comprising:
   Providing a core layer having an outer surface;
   Applying a first adhesive layer to at least a portion of the outer surface, the first adhesive layer comprising a first pressure sensitive adhesive;
   At least one of the first adhesive layer or the core layer further comprise a fire retardant selected from the group consisting of antimony free fire retardant, polybrominated biphenyl free fire retardant, intumescent fire retardant, and combinations of the foregoing, wherein the tape will pass (1) F.A.R.§ 25.853 (July 1990), 12 Second Vertical Burn Test; and
   The core layer further comprising reinforcing microfibers oriented in the machine direction of the core layer, the reinforcing microfibers providing stretch release properties to the tape.

10. The method of claim 9 wherein the outer surface comprises a first major surface and a second major surface, the applying of a first adhesive layer comprises applying the pressure sensitive adhesive to the first major surface, the method further comprising applying a second adhesive layer to the second major surface.

11. The method of claim 10 wherein at least one of the first adhesive layer, the second adhesive layer, or the core layer further comprise a synergist selected from the group consisting of n-alkoxy hindered amine, tris (tribromoneopentyl)phosphate, melamine phosphate, melamine polyphosphate, and boroxo siloxane elastomer.

12. The method of claim 9 wherein the outer surface comprises a first major surface and a second major surface, the first adhesive layer adhered to the first major surface and a second adhesive layer to the second major surface, the first adhesive layer and the second adhesive layer comprising a material selected from the group consisting of acrylic polymers, polyurethanes, thermoplastic elastomers, block copolymers, polyolefins, silicones, rubber based adhesives, a blend of an acrylic adhesive and rubber based adhesive, and combinations of the foregoing.

13. The method of claim 12 wherein the core layer and at least one of the first adhesive layer or the second adhesive layer are co-extruded.

14. The method of claim 9 further comprising exposing the tape to a radiation source to cross-link at least one of the core, the first adhesive layer, or the second adhesive layer.

15. An assembly comprising:
   a substrate;
   a carpet overlying the substrate; and
   the tape of claim 1 disposed between the carpet and the substrate and adhering the carpet to the substrate.

* * * * *

UNITED STATES PATENT AND TRADEMARK OFFICE
CERTIFICATE OF CORRECTION

PATENT NO.   : 6,866,928 B2
DATED        : March 15, 2005
INVENTOR(S)  : Narum, Timothy N.

It is certified that error appears in the above-identified patent and that said Letters Patent is hereby corrected as shown below:

<u>Column 10,</u>
Line 47, delete "isobomyl" and insert in place thereof -- isobornyl --;

<u>Column 24,</u>
Line 41, delete "(325°F.)" and insert in place thereof -- (320° F) --;

<u>Column 27,</u>
Table 5, Line 3, delete "." after "70°" and insert in place thereof -- , --.

Signed and Sealed this

Eleventh Day of October , 2005

JON W. DUDAS
*Director of the United States Patent and Trademark Office*